(12) United States Patent
Basawapatna et al.

(10) Patent No.: US 6,745,392 B1
(45) Date of Patent: Jun. 1, 2004

(54) ENHANCED SECURITY COMMUNICATION SYSTEM

(75) Inventors: Ganesh Basawapatna, Greenwood Village, CO (US); Varalakshmi Basawapatna, Greenwood Village, CO (US)

(73) Assignee: Symphony Media Systems, LLC, Centennial, CO (US)

( * ) Notice: Subject to any disclaimer, the term of this patent is extended or adjusted under 35 U.S.C. 154(b) by 0 days.

(21) Appl. No.: 09/391,558

(22) Filed: Sep. 8, 1999

Related U.S. Application Data

(63) Continuation-in-part of application No. 09/149,194, filed on Sep. 8, 1998, now Pat. No. 6,598,231.

(51) Int. Cl.$^7$ .......................... H04N 7/18; H04N 7/173
(52) U.S. Cl. .......................... 725/120; 725/78; 725/106
(58) Field of Search ...................... 725/118, 119, 725/120, 25, 27, 28, 31, 78, 82, 106, 111, 126

(56) References Cited

U.S. PATENT DOCUMENTS

| | | |
|---|---|---|
| 3,889,050 A | 6/1975 | Thompson |
| 3,990,012 A | 11/1976 | Karnes ........................ 325/308 |
| 4,331,974 A | 5/1982 | Cogswell et al. ............. 358/86 |
| 4,475,123 A | 10/1984 | Dumbauld et al. ......... 358/114 |
| 4,823,386 A | 4/1989 | Dumbauld et al. ........... 380/13 |
| 4,829,560 A | 5/1989 | Evanyk et al. |
| 4,901,367 A | 2/1990 | Nicholson |
| 5,220,420 A | 6/1993 | Hoarty et al. |
| 5,243,647 A | 9/1993 | Parikh et al. .................. 380/4 |
| 5,247,347 A | 9/1993 | Litteral et al. |
| 5,382,971 A | 1/1995 | Chanteau |
| 5,408,260 A | 4/1995 | Arnon |
| 5,481,757 A | * 1/1996 | Mihara et al. ............... 725/119 |
| 5,495,483 A | 2/1996 | Grube et al. |
| 5,521,906 A | 5/1996 | Grube et al. |
| 5,613,190 A | 3/1997 | Hylton |
| 5,774,527 A | 6/1998 | Handelman et al. ..... 379/93.07 |
| 5,790,176 A | 8/1998 | Craig .......................... 348/13 |
| 5,790,806 A | * 8/1998 | Koperda ..................... 709/252 |
| 5,812,928 A | * 9/1998 | Watson, Jr. et al. ........ 725/118 |
| 5,847,660 A | * 12/1998 | Williams et al. ............ 370/227 |
| 5,847,751 A | 12/1998 | Safadi ........................... 348/7 |
| 6,188,871 B1 | * 2/2001 | Kitamura et al. ........... 725/120 |
| 6,243,446 B1 | * 6/2001 | Goodman ................ 379/93.01 |

* cited by examiner

*Primary Examiner*—Andrew Faile
*Assistant Examiner*—Andrew Y Koenig
(74) *Attorney, Agent, or Firm*—Robert G. Crouch; Marsh Fischmann & Breyfogle LLP

(57) ABSTRACT

A telecommunications system for providing telecommunication services to a plurality of users connected to a loop-through cable distribution architecture. The system includes a signal collection and transmission circuit or headend circuit for collecting and transmitting telecommunication signals to the user. In addition, the system comprises a signal distribution system or circuit operatively connected to the signal collection and transmission circuit for receiving and transmitting telecommunication signals therefrom and thereto. The system includes a user or customer interface device operatively connected to an associated signal distribution circuit for both receiving telecommunication signals from the associated signal distribution circuit and transmitting telecommunication signals to the associated signal distribution circuit. The signal distribution circuit is formed by a node having a plurality of output lines and a service module operatively connected to one of the node output lines. The service module further includes a signal splitter having a plurality of output lines, a user service module circuit operatively connected to one of the splitter output lines, and a processor control circuit operatively controlling the service module.

17 Claims, 11 Drawing Sheets

ENHANCED SECURITY COMMUNICATION SYSTEM

CROSS-REFERENCES TO RELATED APPLICATIONS

This application is a continuation-in-part of application Ser. No. 09/149,194, filed Sep. 8, 1998 now U.S. Pat. No. 6,598,231.

BACKGROUND OF THE INVENTION

The present invention relates generally to a communications system for collecting and distributing selected forms of communication signals, and more particularly to a novel communications system for collecting and distributing television, telephone, and data signals to and from an end user's site.

Mechanisms are known for coupling communication signals by fiber optic or coaxial cable directly to a television receiver or through an interface box to the television receiver. These signals, however, are highly susceptible to theft or diversion to other than the subscribing users. A person desiring to steal the signal may tap into the cable line of an intended user or use hardware and/or software which enables reception and interpretation of unauthorized signals or channels.

Known semi-secure communication systems have made use of complex set-top boxes and receiver interfaces. Such systems are costly and often include more features than users require or need, thus increasing the cost of the interface. Furthermore, in many areas and countries, the bandwidth for communications systems is limited, usually to 300 MHz, as are the number of channels in most television receivers.

A typical head end of a communication distribution system receives analog and digitally compressed signals, modulates the signals onto different carrier frequencies, combines the signals, and sends the signals by fiber-optic or coaxial cable to various electronic nodes, each of which typically serves a large number of users, often as many as 300 or more. At the node, the signal may be distributed directly or be converted to those frequencies compatible with equipment at the user site. Between the head end and the distribution nodes, the path is controlled and secure and thus the signal is difficult to tamper with. Between the nodes and a subscribing user, however, a number of major problems can occur. The signal may be stolen by tapping into the cable, channels may be descrambled using unauthorized descrambling equipment, and the reception of extraneous signals can cause the quality of signal reception at the user's site to be poor. Finally, with much of the prior art equipment, there is no reverse path which enables a subscribing user to communicate with the signal provider other than through the use of conventional telephone equipment and procedures. This makes the provision of value added services, such as telephone and computer services, dependent upon the telephone company for the return path communications.

What is needed is a way to handle a large number of communication channels and different types of communication media (e.g., voice, video, data, etc.) without added cost.

SUMMARY OF THE INVENTION

According to the invention, a telecommunication system for providing telecommunication services to a plurality of users comprises a signal collection and transmission system (also referred to as a headend system) for collecting and transmitting telecommunication signals, at least one signal distribution system operatively connected to the signal collection and transmission system that receives the telecommunication signals from the signal collection and transmission system and transmits or distributes the telecommunication signals, via service modules according to the invention, to a plurality of users, which communicate with customer interface boxes ("CIB") which both receive signals as well as send requests for telecommunication services to the signal distribution system.

The signal distribution system preferably comprises one or more nodes, each having one or more communication lines for connecting to service modules. The service modules preferably connect-to the CIB configured to control and authorize telecommunication service requests from the customer communication devices.

A more complete understanding of the present invention may be derived by referring to the detailed description of preferred embodiments and claims when considered in connection with the figures, wherein like reference numbers refer to similar items throughout the figures.

DESCRIPTION OF THE SPECIFIC EMBODIMENTS

Figure 1:
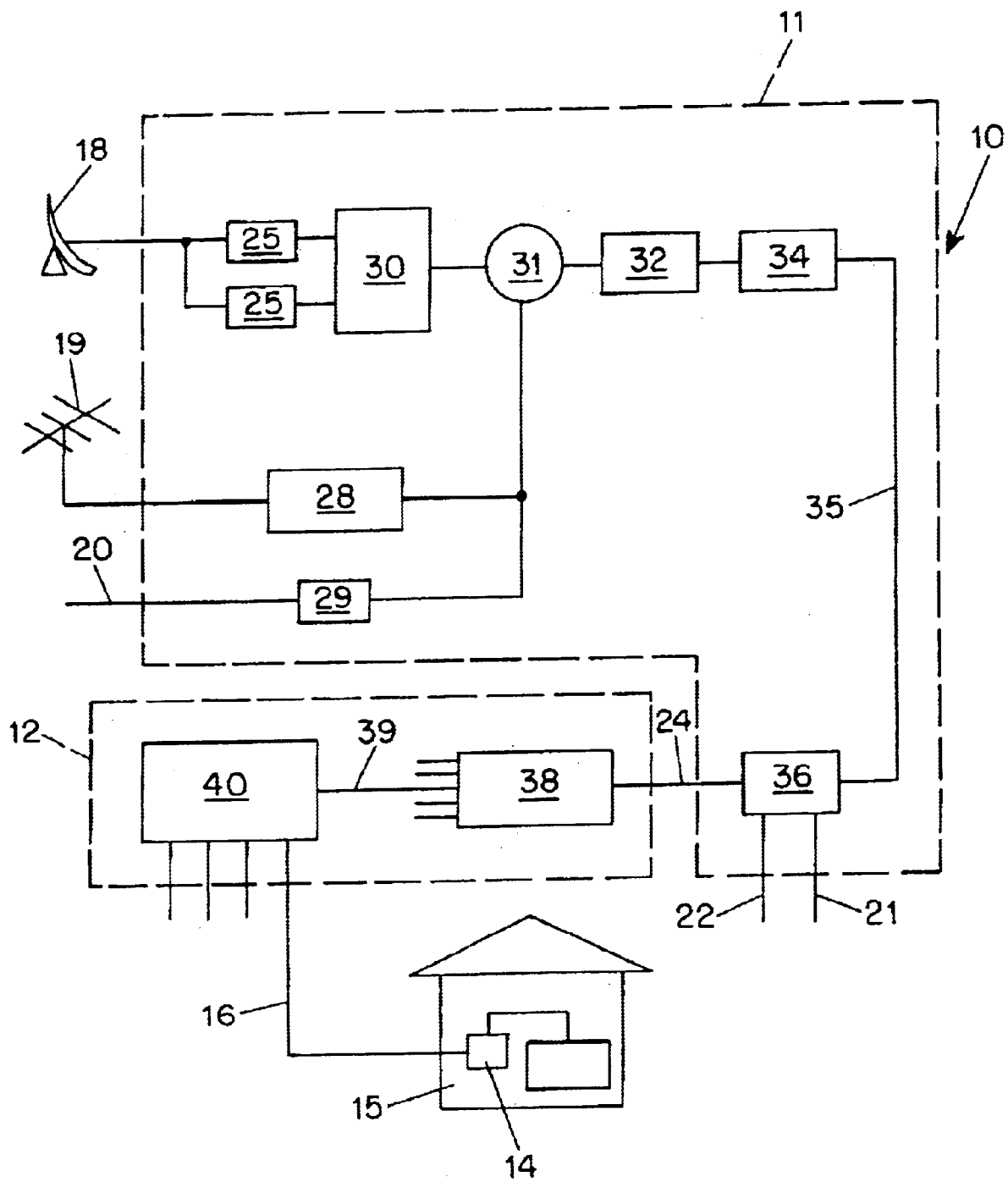
FIG. 1 is a schematic diagram of a telecommunications system.

The present invention is embodied in a telecommunications system 10, as shown in FIG. 1, formed by a signal collection and transmission system or circuit 11, sometimes referred to as a headend system, and a signal distribution system or circuit 12, both of which preferably are located at a secured site or sites. A customer interface box ("CIB") 14, located at a user or subscriber site 15, is operatively connected to the signal distribution system 12 by a suitable connection cable 16, such as a coaxial cable, fiber-optic cable, twisted-pair cable, or other suitable wide bandwidth connection means. In accordance with one embodiment of the present invention, the user site may be a home, office, business, or the like. Such a site typically is not a secure site, so signals received from the telecommunication system headend may be susceptible to theft or misappropriation. By utilizing the unique signal distribution system embodying the present invention located at a secured site, the signals to and from the user site are limited to those specifically requested by the user, and thus, a substantial improvement in the security of the system is achieved. In addition, as discussed in more detail below, the signal channel from the secured site to the end user site also may be scrambled for additional security.

At signal collection or headend system 11, signals, such as cable, broadcast, pay-per-view, video on demand, and Internet signals, may be received from a variety of sources, such as one or more satellite: dish antennas 18, one or more off the air antennas 19, and/or a wide bandwidth cable source 20 carrying a signal from a master headend system (not shown). Additionally, the signal collection or headend circuit 11 desirably includes one or more connections 21 to a telephone network, and one or more connections 22 to a computer system server, such as an Internet connection, or the like.

As one skilled in the art will appreciate, an Internet connection through headend system 11 can be made in a variety of ways. For example, headend system 11 can connect to an Internet service provider (ISP) through a standard phone line, a high-speed DSL line, a coaxial cable, a fibre optic connection or other suitable communication means. However, given the amount of data flowing between headend system 11 and the ISP, the connection 22 between headend system 11 and the ISP is a wide bandwidth connection, such as a coax or fibre optic connection. In accordance with an alternative embodiment, headend system 11 can connect to an ISP through a cable connection, for example, a service provider connected to headend system 11 via wide bandwidth cable source 20, or headend system 11 can include a network server (not shown) for providing Internet connectivity services through cable connections itself.

In accordance with an embodiment of the present invention, signal collection or headend system 11 provides an output signal through a communication connection 24 to signal distribution system or circuit 12. Communication connection 24 may comprises any suitable high-speed or wide bandwidth connection, but in accordance with one embodiment of the present invention, communication connection 24 comprises a coaxial cable connection or a fiber-optic cable connection. The output signal from signal collection or headend system 11, which is sent through connection 24 to signal distribution system 12, preferably comprises a combination of video and/or television signals for a plurality of channels, as well as telephone, computer data, and system information signals, which signal collection or headend system 11 generates or receives from its various sources. The signal(s) which pass between signal collection or headend system 11 and signal distribution system. 12 may be analog, digital, or a combination of both analog and digital.

Still referring to FIG. 1, satellite dish antenna 18 may receive analog or digitally compressed video channels from various satellites. In accordance with one aspect of the present invention, the signals received by satellite antenna 18 preferably are analog. In particular, the analog signals are received from the satellite in a frequency range between about 3.7 and about 4.2 GHz. The analog signal then passes to a low noise block converter (LNB) (not shown) which converts the signal to L-band frequencies (about 950 to about 1450 MHz or higher). Next, the signal passes to one or more analog integrated receiver decoders ("IRDs") 25 which converts each channel residing in the L-band frequency to a baseband frequency. Thus, as one skilled in the art will appreciate, it is preferable to have one IRD for each channel residing in the signal. From IRDs 25, the individual baseband channels are modulated to a channel (i.e., carrier frequency) chosen by the cable system operator by modulator video processor 30. In addition, modulator video processor may be configured to encrypt the signals or otherwise scramble the signals so that only the paying subscribers will be able to descramble or de-encrypt the signals.

As mentioned briefly above, satellite antennas 18 also may receive digitally compressed signals from the satellites. In accordance with this aspect of the invention, the signals may be handled in two different ways, one way for an analog only cable system, and one way for a digital or analog and digital cable system. If the cable system is purely an analog system, or if the cable operator decides to distribute particular digital channels on an analog channel line-up, then the digitally compressed signals are processed in the same manner as discussed above with respect to the analog signals, except that a digital IRD 25 will be used in place of an analog IRD. However, if the cable system has digital capabilities, and the cable system operator wishes to distribute the digital channels in digital form, then an integrated receiver transcoder ("IRT") is used to change the digital modulation and the error correction protocol from QPSK modulation to QAM modulation, which is suitable for cable transport. Then, modulator video processor 30 will modulate the digitally modulated RF signal to a desired RF channel position.

Typically, the off-air signals received by antenna 19 are not scrambled. Thus, in accordance with the present invention, the signals preferably pass to a demodulator/modulator unit 28 which demodulates the received signals to baseband and then remodulates the signal channels to the appropriate cable system channel frequency as selected by the cable operator. In addition, as one skilled in the art will appreciate, if the received off-air signal channel already is at the frequency which will be sent to the user's, then the demodulator/modulator 28 will not demodulate and remodulate the signal, but will merely pass the signal on.

Finally, signals received via wide bandwidth connection 20, are treated in the same manner as signals received by satellite antennas 18. That is, the signals are decoded and then demodulated and remodulated to a desired channel frequency. If wide bandwidth connection 20 also is providing wide bandwidth Internet connectivity, for example, cable system Internet connectivity using Data-Over-Cable Service Interface Specification (DOCSIS) or other standards based connectivity, a Cable Modem Transmission System (CMTS) may be used with modulator 29. That is, modulator 29 also could be configured after a CMTS in a DOCSIS compliant system or other suitable data transmission system for cable connectivity.

The signals from modulator video processor 30 and the other video modulators/demodulators 28 and 29 then are combined and summed by a combined circuit 31 into a single video signal. The single video signal preferably comprises all the channels that a customer or user of the system may desire or be capable of receiving. For example, the signal from combiner circuit 31 comprise, local broadcast television channels, cable television channels, pay-per-view channels, and video on demand channels.

A video output signal from combiner circuit 31 then is transmitted to an access control system 32 and data path modulator 34. In accordance with a preferred embodiment of the present invention, access control system 32 keeps track of the user authorization for each channel. For example if a user purchases rights to receive certain cable channels, such as HBO, Showtime, pay-per-view channels, or the like, access control system 32 will keep track of the authorization of users to receive these channels. The authorization information for each user then typically is sent to the service modules 40 in a separate channel bandwidth frequency range. As discussed in more detail below, the authorization information then is used by the service modules to determine whether to send a requested channel to a particular user, or not. As one skilled in the art will appreciate, access control system 32 may comprise a suitable computer database and system for maintaining user authentication information.

Data path modulator 34 preferably is a commercial piece of hardware typically configured to receive user authentication data, as well as other data, such as system messages, and the like, and modulate that data to a particular channel frequency. As one skilled in the art will appreciate, because the communication system of the present invention probably will have a large number of users, a large amount of user authentication data will be transmitted to the service modules 40. Therefore, in one embodiment, it is preferable to send the information through the system on one or more separate channel carrier frequencies, rather than appending the channel authentication information to the individual video channels.

After the data has been modulated to the appropriate frequency, the video and data signal then is sent through a high-speed or wide bandwidth connection 35, such as a fiber-optic or coaxial cable connection, to a signal separator 36. Telephone and computer connections 21 and 22 likewise are fed to signal separator 36. In accordance with one embodiment of the present invention, signal separator 36 preferably produces a forward path signal which may include video, system data, telephone, and computer signals, and sends the forward path signal to distribution systems or circuits 12 through wide bandwidth communication connections 24. In addition, signal separator 36 preferably extracts telephone and/or computer signals from the reverse or return path signal of communication connection 24 and sends the telephone voice and/or computer data signals over telephone connection 21 and computer connection 22, respectively. Telephone connection 21 may be connected to a local exchange carrier or a long distance carrier, whichever is appropriate. Also, computer connection 22 can be any suitable communication connection, such as standard telephone, high speed telephone (e.g., DSL, ISDN) coax cable, fibre optic, or the like.

As illustrated in FIG. 1, the output signal from headend system 11, the information of which can be in analog form, digital form, or a combination of both, is transmitted through communication connection 24 to signal distribution system 12, which preferably comprises one or more cable nodes 38 and a plurality of service modules 40. Nodes 38 typically are fiber-optic or coaxial cable systems, or combinations thereof, and are constructed to meet the bandwidth requirements of the system. In conventional cable systems, such nodes each typically serve about 50 to 500 customers, and more preferably about 100 customers. In accordance with the present invention, each node 38 typically serves about 10 to about 40 service modules, and each service module in turn serves between about 10 and about 40 user sites.

At node 38 the signal typically is converted from fiber-optic to coaxial form (i.e., optical to RF) using an opto-electronic (O/E) converter circuit and then transmitted to service modules 40. As one skilled in the art will appreciate, as the signals pass to service modules 40, the signals may pass through a number of signal splitters or couplers and amplifiers. Since the signal between nodes 38 and service modules 40 have both forward and return paths, the splitters and amplifiers preferably are configured to handle the dual path.

In accordance with one embodiment of the present invention, forward path communications (i.e. video and forward path telephone and data) between service modules 40 and customer interface boxes ("CIBs") 14 at the user sites 15 preferably occur either at baseband frequency or at a very low frequency channel, such as channels 2, 3, 4 or 5 across connection 16. Also, as one skilled in the art will appreciate, data being transmitted to end users may be transmitted on a separate data channel, which typically will be determined by the cable system and the CMTS. Connection 16 may comprise any suitable connection, such as fibre optic, coaxial cable, twisted pair telephone cable, POTS telephone cable, or any other suitable communications connection. Moreover, more than one communication connection 16 may exist between site 15 and service module 40. The signal from service module 40 to CIB 14 preferably is in RF analog forth; however, the signal also may be transmitted in digital form. For example, a digital signal may pass through a coaxial connection to CIB 14, or an xDSL line may be used to transport the digital information.

The return path or reverse path communication from CIB 14 to service module 40 preferably comprises telephone, computer, and user request data from modem 66 (see FIG. 2) and preferably is modulated onto a carrier frequency between 5 and 50 MHz. In a typical DOCSIS compliant system, the CMTS informs the cable modem connected to a computer of the frequency for return transmission. As discussed in greater detail below, CIBs 14 need little built-in intelligence, but can be upgraded to a higher computational level if desired. In addition, in accordance with alternative embodiments of the present invention, instead of telephone, data and user request information being transmitted from CIB 14 to service module 40 via the return path of connection 16, a separate communication line may be used; for example, a user's existing telephone line.

Figure 2:
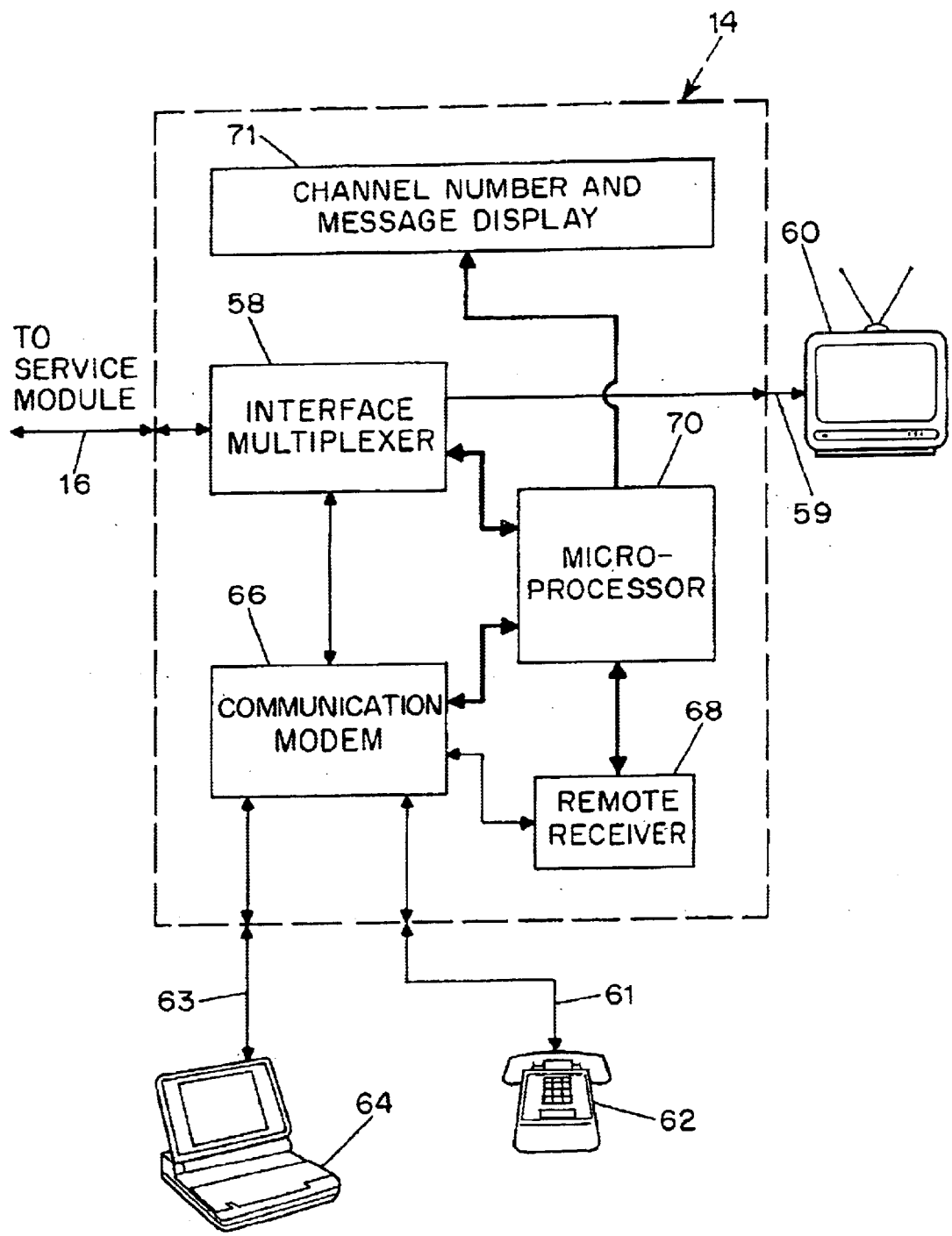
FIG. 2 is a schematic diagram of a user or customer interface box forming a part of a telecommunications system.

Referring now to FIG. 2, a more detailed illustration of one embodiment of a customer interface box ("CIB") 14 is shown. In particular, CIB 14 comprises an interface multiplexer (MUX) 58, a modem 66, a receiver 68, a processor 70, and a display device 71. In accordance with one embodiment of the present invention, the signal from service module 40 is received at CIB 14 by interface MUX 58 via connection 16. CIB 14, and in particular interface MUX 58, is in turn connected by a connection 59 to one or more television sets 60. In addition, interface MUX 58 is connected to one or more telephone sets 62 and one or more computers 64 by connections 61 and 63, respectively.

Interface MUX 58 preferably filters the video signal(s) from the forward path and sends it to the one or more television sets 60 via connection(s) 59. Similarly, interface MUX 58 filters out the forward path telephone, computer data and system message signals and sends them to modem 66. Finally, interface MUX 58 receives return path information from modem 66, which is modulated on a carrier between 5 and 50 MHz and sends the carrier with the return path data back to service module 40. Modem 66 can be any suitable modem, such as a standard telephone line modem, a xDSL compatible modem, a DOCSIS compliant cable modem, or any other suitable communication modem In accordance with the illustrated embodiment, information from telephone set 62, computer 64 and receiver 68 preferably pass through modem 66, which converts the computer data, telephone voice and user request information to the proper form (i.e., analog or digital), and modulates the information to the return path frequency (e.g., 5–50 MHz). For example, if the signals passed between service module 40 and CIB 14 are in analog form, the digital computer signals from computer 64 preferably should be modulated to the proper return path frequency by modem 66 before they are passed over communication connection 16 to service module 40. Similarly, computer signals received by CIB 14 should be converted to digital form before being passed to computer 64 or processor 70. Also, as one skilled in the art will appreciate, even if the signals between service module 40 and CIB 14 are digital signals, modem 66 may still be needed to modulate the return path information to the proper frequency, and the modem may be need to facilitate the return path communication protocol; for example, if xDSL or another suitable digital communication means is used.

As illustrated in FIG. 2, CIB 14 further comprises receiver 68 for receiving user request signals. For example, receiver 68 may be configured to receive user request and message information from a remote control device, such as a laser diode, infrared, or RF remote control device, or receiver 68 may have a cable connection to a signal source (not shown). Thus, CIB 14, is addressable by means of a conventional hand-held remote control unit or other similar control device.

The operation of CIB 14 in this particular embodiment is controlled by an internal processor 70. For example, in accordance with a preferred embodiment of the, present invention, processor 70 facilitates the transfer of the television or video signal from interface MUX 58 to television 60. In addition, processor 70 preferably interfaces with modem 66, dictating to the modem how it should handle voice and computer data information. Finally, processor 70 preferably coordinates sending user request and message information received by receiver 68 back to service module 40 (via modem 66), and facilitates the display of channel and system message information on display 71. System message information may include billing information, as well as authorization or system messages from the headend or service provider via service module 40.

Figure 3:
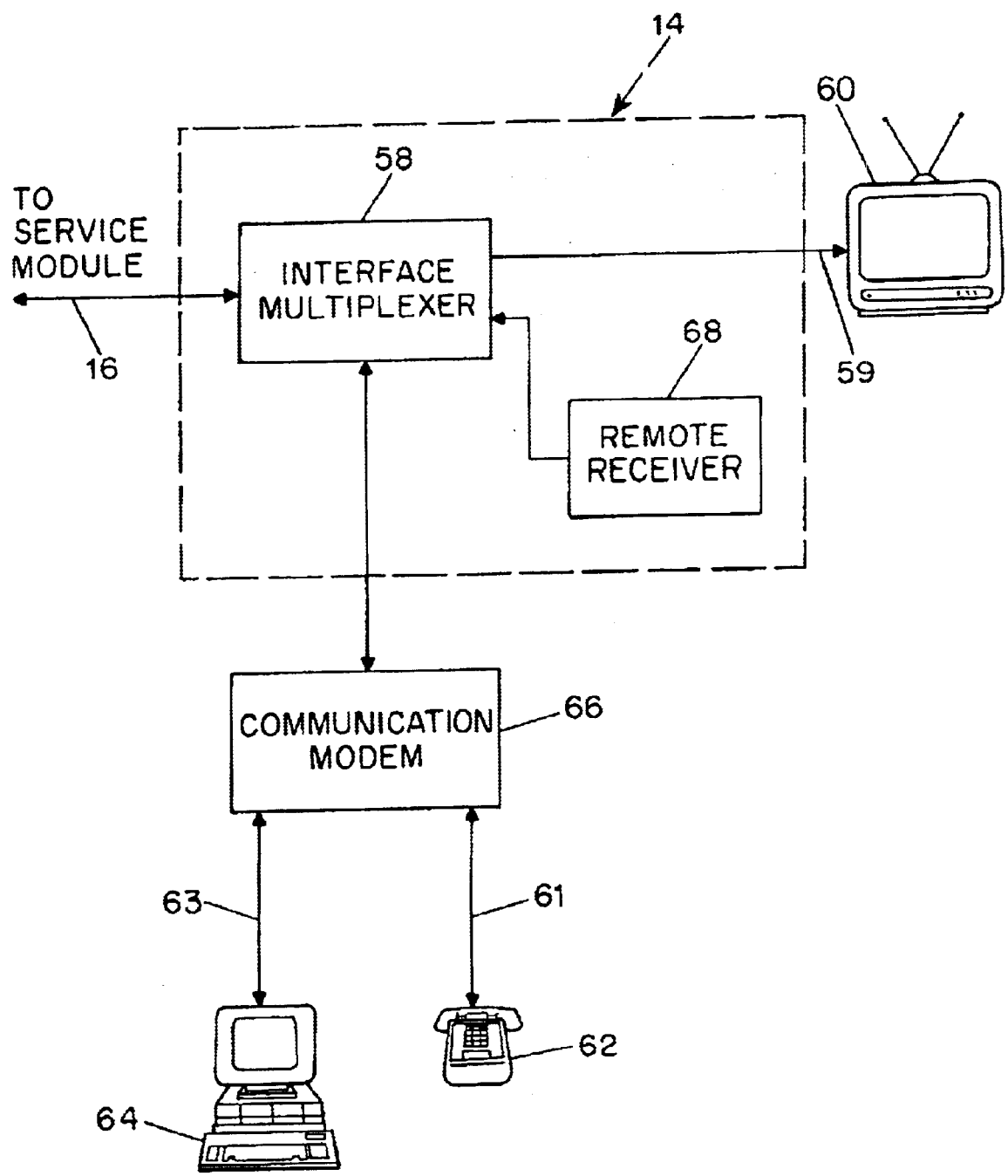
FIG. 3 is a schematic diagram of an alternative embodiment of a user or customer interface box forming a part of a telecommunications system.

In accordance with an alternative embodiment of the present invention, a cheaper CIB 14 having less intelligence could be used. For example, as illustrated in FIG. 3, CIB 14 may be configured with an interface MUX 58 and a remote receiver 68 for receiving signals from a remote control device. Interface MUX 58 is configured to receive the voice, data and video signals from service module 40 via connection 16 and split and forward the respective signals to the proper locations. For example, the voice and data signals are passed to communication modem/multiplexer 66, and the video signals are passed to a television set for viewing. As with CIB 14 illustrated in FIG. 2 and discussed above, communication mix or modem 66 preferably converts the signal to the appropriate analog or digital form, and then passes the voice signals to telephone 62 and the data signals to computer 64. Also, interface MUX 58 may include a decryption or descrambling circuit for decrypting or descrambling the signal from service module 40 if the signal was first encrypted or scrambled prior to transmission to CIB 14.

As one skilled in the art will appreciate, while FIG. 3 shows the separate video, voice and data signals going to televisions 60, telephone 62 and computer 64 respectively, all the signals may pass to a single device which can operate as a TV, computer and/or a telephone.

In accordance with one embodiment of the present invention, the video and audio portions of the video signal are modulated together onto an RF carrier, for example, channel 2, 3, 4, or the like and transmitted from service module 40 to CIB 14 over a communication connection. In one aspect of the invention, the video portion of the signal is in composite video format and the audio portion of the signal is in a single channel audio signal, which could be a two channel stereo signal modulated onto a single channel. In accordance with this aspect of the present invention, CIB 14 can pass the composite video and audio signals to the television viewing set or to a home theater or stereo system via a suitable communication connection, such as a coax cable, or other suitable communication cable. Alternatively, CIB 14 may be configured with an S-Video (also known as Y/C Video) generator and/or a stereo or surround sound generator. In accordance with this aspect of the present invention, a suitable S-Video or Y/C Video cable and suitable stereo connection cables are used to connect the television or home theater system to CIB 14.

As one skilled in the art will appreciate, an S-Video or Y/C Video generator preferably comprises a suitable comb filter mechanism adapted to separate the Y and C components of the video signal from the composite video signal. The stereo or surround sound generator may comprise any suitable sound mixing system which can create a 2-channel or 6-channel signal from a single audio signal. The surround sound signal may be Dolby AC-3, Sony Dynamic Digital Sound, Digital Theater Systems, or any other.

In accordance with an alternative embodiment of the present invention, instead of CIB 14 converting the signal to S-Video and/or stereo audio, service module 40 may do the conversion. This particular embodiment is discussed in more detail below.

Figure 4:
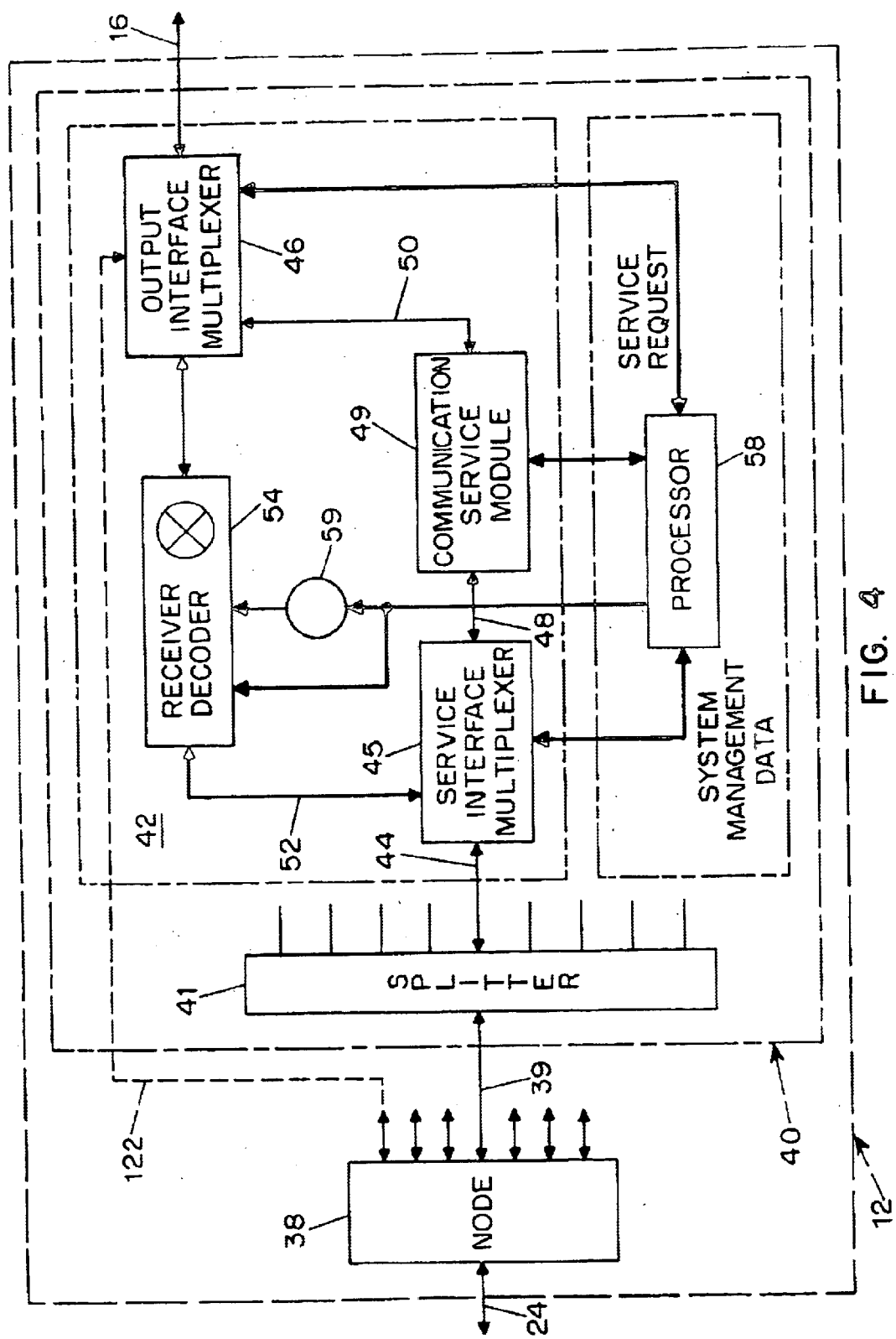
FIG. 4 is a schematic diagram of a service module forming a part of a telecommunications system.

Referring now to FIG. 4, a more detailed illustration of distribution system 12, and in particular service module 40, is shown. As mentioned above, distribution system 12 preferably comprises one or more nodes 38 which connect to a plurality of service modules 40.

In accordance with a preferred embodiment of the present invention, service modules 40 preferably are configured to receive signals from headend system 11 and distribute them to authorized service requesting users at user sites 15 via CIB 14. Service modules 40 also can handle two-way telephone and computer traffic for each user. Each service module 40 is designed to serve a number of users simultaneously, such as between about 5 and about 50 users, and more preferably about 20 users.

The present invention is based on the premise that all video communications between service modules 40 and CIBs 14 occur over one or more channels of television bandwidth, typically one channel for each TV set having its own CIB 14. The channels are communicated either as a baseband audio and video signal, or as a low frequency channel such as 2, 3, 4, or 5. As a result of only one or a few channels being sent to each user site 15, signal stealing is reduced because only a few channels can be stolen at a time, and the party stealing the signal is limited to watching the channel(s) selected by the valid user. In addition, if the valid user turns off his TV set, there can be no signal stealing as no signal is being transmitted to the CIB. This premise, of course, presupposes that all cable connections and hardware devices between headend system 11 and service modules 40 are secure. Such security can be achieved by providing secure buildings and structures for all headend, node and service module equipment, as well as using sophisticated jamming algorithms and other forms of scrambling and encryption. One skilled in the art will appreciate that the video signal received and processed by service modules 40 may be analog signals, digitally compressed signals, or a combination of both. Therefore, the type of signal (i.e., analog or digital) will dictate the type of scrambling, jamming and/or encryption techniques used. In addition, if additional security is needed, the signal between service module 40 and the user site 15 also can be scrambled, jammed and/or encrypted.

Service module 40 preferably is an addressabile or programmable module, which receives an encrypted, scrambled, jammed, and/or frequency shifted signal having a plurality of channels modulated therein. Service module 40 then converts a user requested video channel from its modulated frequency in the signal to baseband and then perhaps to a low frequency channel and transmits it to the requesting user. Thus, in accordance with a preferred embodiment of the present invention, a significant amount of the intelligence and decision making aspects of the system are provided within service module 40, as shown schematically in FIG. 4. In particular, service module 40 preferably includes a signal power splitter 41 which receive signals from and transmit signals to cable node 38 through a wide bandwidth communication line 39, such as a coaxial cable, fiber-optic cable, or the like. In addition, signal power splitter 41 preferably amplifies and distributes signals to individual user circuits 42 in service module 40, through splitter connections 44.

Individual user segments or circuits 42 of service module 40 preferably communicate with the individual CIBs 14 of each user. Each such user circuit 42 preferably comprise a service interface multiplexer (MUX) 45, an output interface multiplexer (MUX) 46, a communication service module 49, a receiver decoder 54, and a modulator 59. In addition, if the signal from service module 40 to CIB 14 is scrambled or encrypted, each user circuit 42 also will include a scrambling or encryption circuit. The scrambling or encryption circuit may be a separate circuit or device within user circuit 42, or the scrambling or encryption circuit may be configured as part of one of the other components, such as receiver decoder 54, modulator 59, output interface MUX 42, processor 58, or the like. Service interface MUX 45 of service module 40 preferably is configured to receive a communication signal from node 38 via splitter 41 and splitter connection 44. Service interface MUX 45 in turn sends the signal to output interface MUX 46 either through communication service module 49, which handles telephone and computer traffic for the user, or through receiver decoder 54, which handles the video signals.

In accordance with this aspect of the present invention, if the signal includes telephony or computer signals, service interface MUX 45 preferably passes the telephony and/or computer components of the signal to communication service module 49 via connection 48. If the user is authorized to receive the telephony and/or computer signal(s), communication service module 49 then passes the signal to output interface MUX 46 via connection 50. Thus, in essence, communication service module 49 acts as a communication switch allowing the telephony and/or computer signals to pass through if the user is authorized for such services. Otherwise, if the user is not authorized, communication service module 49 will prevent the communication.

As mentioned above, the signal from headend system 11 may be analog, digital, or a combination of both. Regardless of its form, if the telephony and/or computer data is modulated onto an analog channel and communication service module 49 preferably passes the signal to CIB 14 if the user is authorized to receive the service.

The video portion of the signal, which may be analog, analog scrambled, or digitally compressed and encoded preferably is passed to receiver decoder 54 via connection 52. Upon receiving the video signal, receiver decoder 54 descrambles or decrypts the signal and converts the particular video channel requested by a user from its modulated or compressed waveform to baseband frequency. Once the signal is at baseband, receiver decoder 54 can pass the signal to output interface MUX 46 via connection 55 at baseband, or receiver decoder 54 can remodulate the signal to a predetermined low frequency channel, such as channel 2, 3, 4 or 5, and send the signal out at that frequency. As discussed in greater detail below, receiver decoder 54 preferably utilizes modulator 59 to convert the selected channel from its modulated frequency to baseband frequency, and then if appropriate, to the low frequency channel output. Also, if scrambling or encryption is desired, it can be done at this point. The scrambling can be spectral inversion (performed by the local oscillator and/or modulator), synch suppression which makes the signal unwatchable at an unauthorized receiver, or a combination of both techniques. In addition, if the signal from service module 40 to CIB 14 is a digital signal, digital encryption techniques may be used.

Once output interface MUX 46 has received the video, voice and/or computer signals from receiver decoder 54 and communication service module 49, it in turn sends the signal through communication connection 16 to the subscriber or user customer interface box (CIB) 14. In addition, if the subscriber premise or user site has more than one TV that is independently tuned (i.e., has its own CIB), service module 40 preferably will have one receiver decoder 54 per TV set. Each receiver decoder 54 will modulate each program requested from each TV to a different channel, say 2, 3, 4 or 5. The channels then will be combined together by the same output interface MUX 46.

Service interface MUX 45, output interface MUX 46, receiver decoder 54, communication service module 49, and modulator 59 of each user circuit 42 preferably are controlled by a common processor 58. As one skilled in the art will appreciate, processor 58 may comprise any suitable computer processor and may further be configured with memory, storage and communication buses and interfaces, as necessary.

In accordance with one embodiment of the present invention, processor 58 preferably controls all functions for each user of a particular service module 40. For example, processor 58 may be programmed or configured to maintain all billing information, perform routine checks to verify that the signal is not being stolen, handle user requests, control the allocation of system management data and subscriber messages, perform digital encryption processes, and download television and pay channel programming information to CIBs 14. In addition, processor 58 can be configured to receive security information about each household, and perform functions such as meter reading by communicating with meter reading circuitry connected to a data port of CIB 14 or connected to a computer which is connected to the CIB data port.

Processor 58 preferably provides control signals to the various components of service module 40 to control the operation of the service module and the system. For example, when a user sends a request for a particular video channel, this request preferably arrives at output interface MUX 46 where it is recognized as a service request and sent to module control processor 58. The request message or code preferably includes the channel request, as well as various customer information, such as the customer's identification number, and secret code or password. In addition, processor 58 may be programmed to ask for additional identification information from the user if necessary.

Upon receipt of the channel request and customer information, processor 58 then verifies that the customer or user is a valid customer and also verifies that the customer is authorized to receive the requested channel. If the customer passes the authorization checks, processor 58 sends the appropriate tune signal to modulator 59 and the appropriate descrambling or decoding command to receiver decoder 54.

As one skilled in the art will appreciate, the video or television signal received by service module 40 from headend system 11 may be scrambled or encrypted in accordance with one or more scrambling techniques. For example, encryption, synchronization suppression, spectral inversion, jamming, non-standard frequency modulation, or a combination thereof may be used. In addition, some of the channels modulated in the signal may be analog and others digital. Thus, user circuits 42 preferably are configured to decode or decrypt the signal and handle both analog and digital channels at the same time. For example user circuits 42 may have analog receiver decoders 54 to handle the analog portion of the signal and a digital receiver decoder (or transcoder) to handle the digital portion of the signal. Preferably processor 58 includes the descrambling or decoding intelligence and instructs receiver decoder 54 (and the digital transcoder) as to how to handle the decoding in accordance with the proper decoding scheme. Also, if this signal from service module 40 to CIB 14 is to be scrambled, processor 58 will dictate the scrambling technique and control the scrambling process.

For digitally compressed video signals, typically about six (6) to ten (10) channels are compressed together in about 6 MHz of an RF signal. Thus, when digital receiver decoder 54 in user circuit 42 receives the digitally compressed signals it selects the group of digitally compressed signals carrying the requested channel. Receiver decoder 54, preferably using modulator 59, then demodulates the group of channels from its modulated frequency to baseband and decompresses the compressed channels. Then, receiver decoder 54 preferably decrypts the channels if they were encrypted at the headend and selects the one channel that the user requested. Receiver decoder 54 then transmits the clean channel to output interface MUX 46 at baseband, or receiver decoder remodulates the signal to a low frequency channel, such as 2, 3, 4, or 5, as desired, preferably using modulator 59. Output interface MUX 46 then transmits the signal on to CIB 14. As one skilled in the art will appreciate, the digital receiver decoder preferably is adapted to handle any digital encryption techniques including asynchronous encryption or synchronous encryption like DES.

For analog video signals, typically one channel is modulated into about a 6 MHz band of an RF signal. Thus, when an analog receiver decoder 54 in user circuit 42 receives the analog signal it converts it from its modulated frequency to baseband, preferably using modulator 59. Then, if baseband scrambling or jamming was used at the headend system, receiver decoder 54 preferably descrambles the channel and transmits the clean channel to output interface MUX 46 at baseband: Alternatively, receiver decoder 54 can remodulate the signal to a low frequency channel, such as 2, 3, 4, or 5, as desired, preferably using modulator 59, and then transmit the low frequency channel to output interface MUX 46. Output interface MUX 46 then transmits the signal on to CIB 14. As one skilled in the art will appreciate, the analog receiver decoder preferably is adapted to handle any type of scrambling technique used at the headend system, including RF or baseboard scrambling or jamming. As one skilled in the art will appreciate, if RF scrambling or jamming was used, receiver decoder 54 will descramble the signal prior to converting the channel to baseband or the low frequency channel (2, 3, 4, etc.) Also, instead of converting the desired channel to baseband before converting it to the low frequency channel, modulator 59 can be configured to convert the channel directly from its undulated frequency to the low frequency channel without first converting it to baseband.

During the authorization process, if the customer is an invalid or unauthorized customer, processor 58 preferably sends an alarm to headend system 11 through the system management data bus to inform the headend system that an invalid customer is on the port. Processor 58 also then turns off the modulator 59 for that particular user port 42, in effect disabling the port until the headend system solves the illegitimate request problem. Once the problem is rectified, headend system 11 can reactivate the port, either locally or remotely from the headend system.

In accordance with a further aspect of the present invention, if a customer or user requests a channel which he is not authorized to receive, processor 58 preferably will send a system message to the CIB 14 for that user, informing the user that he requested an invalid or unauthorized channel. Preferably, the message will be displayed on display 71 of CIB 14 (See FIG. 2) or on the TV screen.

In accordance with yet another aspect of the present invention, if the user requests a pay-per-view or video on demand movie or feature, processor 58 checks to see if the user has sufficient credit for that purpose. This can be done in several ways. For example, processor 58 may check a credit report for the user or the user's payment history. If the user has a sufficient credit rating or an adequate payment history, processor 58 will allow the request and bill the user; otherwise, processor 58 will reject the request and send a message to the user stating the reason for rejection. In addition, the system may be set-up so that the user must pre-pay for any pay channel requests. In this manner, the user preferably has an account with payment credits in it. If the user has enough available credits, processor 58 will allow the pay channel request and debit the user's credit account; otherwise, processor 58 will reject the request and send a message to the user stating the reason.

As with the other video channels, if the pay channel request is allowed, processor 58 will direct receiver decoder 54 to select the pay channel from the video signal stream, and modulator 59 will convert the pay channel from its modulated frequency to baseband and then to the appropriate frequency for transmission to the user's CIB 14 (e.g., baseband or channels 2, 3, 4, 5, or the like).

In accordance with still a further aspect of the present invention, processor 58 also desirably may include parental control and other filtering capabilities. For example, processor 58 can be programmed to exclude children from receiving certain selected video channels. Thus, for a parent to receive an excluded channel, the parent preferably will enter a secret code which allows the parent to receive the channel.

In accordance with yet another aspect of the present invention, if customer interface box 14 or the user's television set is switched off, processor 58 preferably receives this information via connection 16 and output interface MUX 46 and shuts off the signal to CIB 14. This effectively protects the system from someone tapping into the cable and watching a video channel when the legitimate subscriber is not watching.

When a user or customer attempts to make a phone call, CIB 14 preferably formats the return path of the signal with a telephone request message and the phone number to be accessed. Processor 58 then receives the phone request and checks whether the user is authorized to receive the telephone service. If so, processor 58 sends a command to the communication service module 49 to connect the customer's telephone connection to the headend system 11 or directly to a telephone public branch exchange (PBX) or long distance carrier via a suitable communication connection, such as a fiber optic cable, coaxial cable, twisted pair phone line, or a satellite or cellular connection. As mentioned above, if the telephone call is connected to headend system 11, preferably the telephone call is communicated to the headend system via the return path of connection 39 to node 38, and from node 38 via connection 24 to the headend system (see FIG. 1).

In a similar manner, if a user requests data or internet access services, processor 58 receives the service request and user information from CIB 14 via the return path of communication connection 16. Again, processor 58 verifies that the customer is authorized for such services and then, if authorized, instructs communication service module 49 to connect communication device 14, and in particular, computer 64 to the return path back to a computer or internet connection at the headend system, for example, via connection 22 or wide bandwidth connection 20. In accordance with one embodiment of the present invention, service interface MUX 45 for each user circuit 42 in service module 40 preferably are configured to separate forward and reverse signals to and from headend system 11. Signals from headend system 11 typically comprise various encrypted television broadcast, cable and pay channels which can be in analog form, digitally compressed form, or a combination of both. Signals from headend system 11 also may include forward path data for the customers' computer and/or telephone communications, as well as global and/or individual messages or instructions to the various service modules or individual subscribers. These forward path signals typically are modulated to frequencies above 50 MHz.

Reverse or return path signals from the service modules to the headend system typically comprise telephone and computer communications from the users, as well as customer service requests, pay-per-view program requests and system management data, such as repair, maintenance, and status information messages from the users or the service modules. In accordance with a preferred embodiment of the present invention, return path signals typically are communicated at frequencies below 40 MHz, and more specifically between about 4 MHz and about 40 MHz. In accordance with this aspect of the invention, service interface MUXs 45 preferably have a 50 MHz high pass filter in the forward path and a 50 MHz low pass filter in the return path, thus separating the forward and return paths of the signals. In addition, service interface MUXs 45 may be configured to create or format the return path signal by combining the outgoing telephone and/or computer communications signals, and the system management data into a block of return path data, and ensuring the return path information or data is formatted or modulated to the appropriate return path frequencies. However, while in accordance with the described embodiment of the present invention, service interface MUXs 45 are configured to format the return path to headend system 11, one skilled in the art will appreciate that other modules or components of service module 40 may be configured to format the return path data. For example, processor 58 and/or receiver decoder 54 may be used to combine and format the return path data. Thus, the present invention is not limited to the described embodiment.

Output interface MUXs 46 essentially are similar to service interface MUXs 45 and preferably comprise similar low pass and high pass filters. As discussed above, when a customer requests a particular video or television channel, processor 58 directs receiver decoder 54 (and modulator 59) to convert the video channel from its modulated frequency to the signal's baseband frequency, decrypt or descramble the signal, and then transmit the signal at baseband or a low channel frequency, preferably channel 2, 3, 4 or 5. Thus the video portion of the forward path signal from service module 40 to the user site preferably comprises only one channel for each customer interface box 14. In addition, the telephone and computer information portions of the forward path signal to CIB 14 may be carried in the vertical blanking interval (VBI) of one or more forward path channels, or the telephone and computer information may be formatted into one or more forward path channels.

In accordance with one embodiment of the present invention, the video portion of the signal transmitted from service module 40 to CIB 14 is in composite video form, and the audio portion of the signal is a single audio channel signal, both modulated together in the same RF frequency band. However, in accordance with another embodiment of the present invention, service module 40, and in particular user circuit 42 may be adapted to transmit S-Video (also called Y/C Video) signals and/or 2-channel stereo or 6-channel surround sound signals to CIB 14. In accordance with this particular aspect of the present invention, service module 40 may include circuitry to convert the composite video signal into an S-Video (Y/C Video) signal. For example, a suitable comb filter may be used to extract the Y and C components from the composite video signal. However, since an S-Video signal comprises two separate video signal components instead of a single composite signal, the two signals (Y and C components) should not be modulated to a single modulation frequency. Thus, in accordance with a preferred embodiment of the present invention, each of the Y and C video signal components can be modulated to separate modulation frequency bands and transmitted to CIB 14 as separate channels.

In a similar manner, to forward the audio portion of the video signal in stereo mode (2-channels) or surround sound mode (6-channels), service module 40 preferably includes a stereo or surround sound generating circuit which creates the 2 audio channels for stereo or the 6 audio channels for surround sound. As with the S-Video signal, it is preferable to transmit the multiple audio channels to CIB 14 at separate modulated frequency bands. In this manner, the stereo or surround sound audio separation is not lost by combining the separate channels into the same modulation band.

In accordance with this particular embodiment of the present invention, CIB 14 preferably includes a demodulator for each video and/or audio component of the video signal transmitted in a separate frequency band. For example, if the video signal from service module 40 is transmitted as an S-Video signal and a 2-channel stereo audio signal, the video signal is modulated into 4 separate frequency bands; one for the Y video component, one for the C video component, one for the right stereo audio channel, and one for the left stereo audio channel. In this manner, CIB 14 includes at least 4 demodulators for demodulating each component part. After each component part is demodulated to baseband, CIB 14 transmits the signal to a television set and/or a home theater system using suitable connections. For example, the S-Video signal preferably is transmitted to the TV set using an S-Video cable, and the stereo channels are transmitted to the TV set or stereo system using suitable audio connections, such as cables with RCA connectors or the like.

In accordance with another embodiment of the present invention, if a user site has more than one television, that user site may have more than one CIB 14; one for each television set. Since the user site typically will only have one communication connection to a service module 40, in order for each television set to display a different video signal than the other television sets at the user site, multiple video channels should be transmitted to the user site. Preferably one channel for each television set and associated CIB 14 is transmitted to the user site via communication connection 16. Thus, to accommodate such a configuration, each such CIB 14 associated with each television set preferably is tuned to a different channel, for example 2, 3, 4, 5, etc., and the forward path signal to the user site will include a multiple channel signal, one channel for each device. If the signals from service module 40 are in S-Video and/or stereo audio form, each television set in the home preferably will receive a plurality of frequency bands, one for each component of the video signal for that television set.

In accordance with yet another embodiment of the present invention, instead of each television set in the home having a separate CIB 14, a single CIB 14 may be configured to receive multiple signals; preferably, one signal for each TV set in the home. In accordance with this particular embodiment, since interface MUX 58 in CIB 14 typically is configured to receive all requested channels for each TV set in the home from 30 service module 40, there is no need for additional CIB's other than to process separate channel requests for the separate TV sets. In this manner, it is possible for CIB 14 to be configured to receive RF or other transmissions from multiple remote control devices, allowing remote control devices associated with each individual TV to control the channel input for the TV the remote is associated with, without the need for additional CIBs in the home.

As mentioned above, CIB 14 preferably communicates service request information, and computer and telephony information, if appropriate, to service module 40 via the return path of connection 16. For example, the typical return path of a standard coaxial cable communication connection is the frequency range between about 4 MHz and about 40 MHz. However, in accordance with an alternative embodiment of the invention, the return path can be configured at higher frequency ranges, such as one of the channel frequency ranges between about 50 MHz and about 500 MHz. If communication connection 16 between service module 40 and CIB 14 comprises an xDSL connection, the video and audio signals may be sent from service module 40 to CIB 14 at baseband. In accordance with this particular embodiment of the invention, the return path from CIB 14 to service module 40 then is between about DC and about 128 KHz.

In accordance with another embodiment of the present invention, instead of CIB 14 communicating with service module 40 via the return path of communication connection 16, CIB 14 may communicate with service module 40 via a separate communication connection. For example, service requests, data, and telephony signals from CIB 14 to service module 40 may occur over a standard telephone line, or via another communication connection like PCS, cellular, local multi-point distribution system (LMDS), or the like. Also, service module 40 may communicate with headend system 11 in a similar manner. Therefore the present invention is not limited to using the return path of standard coaxial cable or fiber optic connections.

As discussed above, the return path from CIB 14 to service module 40 preferably is configured to carry data from a user's computer, outgoing telephony signals and user service requests. However, in accordance with yet another embodiment of the present invention, in the event a customer's computer is configured to receive information at baseband, a separate connection from service module 40 to the user site can be provided for carrying the separate baseband output from service module 40 to the computer. Such connection may be a separate cable fibre or copper wire connection so as not to interfere with other data and television signals between the user site and the service module. The computer could connect directly to this connection via a modem, or the like without connecting to the CIB.

The main function of communication service module 49 as shown in FIG. 4 is to handle all voice and data communication according to the needs of the user. As mentioned above, the user's CIB 14 either includes or has connected to it a modem so that data is presented to service module 40 properly formatted. Thus, if processor 58 authorizes a telephone and/or computer service request, communication service module 49 acts as a switch, allowing the telephone and/or computer communication to transfer to service interface MUX 45, and ultimately to the headend system.

As mentioned above, computer and telephony information may be carried in the forward path from service module 40 to CIB 14 in a high frequency dedicated channel (i.e. >50 MHz), in the 4–40 MHz band, or the information can be encoded in the vertical blanking interval (VBI) of one or more video channels.

In accordance one embodiment of the present invention, the forward path data is transmitted from the headend to service module 49 and then on to CIB 14 using a data-over-cable service interface specification (DOCSIS) system or other suitable data-over-cable system. In accordance with this aspect of the present invention, the headend has a cable modem termination system (CMTS), which includes a modulator and demodulator for modulating the forward path data (i.e., from the headend to the end user CIB via a service module) to a particular frequency and for demodulating the return path data (i.e., from a user's computer via a CIB a service module). The CMTS also provides an interface between the cable system and the Internet backbone, either locally, or by reaching a remote Internet backbone point of presence via a wide area network. The CMTS typically will modulate the data to a frequency above 50 MHz and then tell the cable modem which frequency to use for the return path (typically between 4 and 40 MHz).

When the data reaches service module 40, communication service module 49 will pass the data signal to each CIB 14 connected to service module 40. The DOCSIS compliant cable modem in CIB 14 or connected to CIB 14 then will extract the portion of the data signal intended for that particular user. As one skilled in the art will appreciate, each CIB and cable modem connected to service module 40 will receive the entire data signal (i.e., data for all users connected to the service module), not just that particular end user's data. In accordance with this aspect of the present invention, the cable modem is configured to extract the data for its particular end user from the composite data signal.

For the return path, the cable modem will modulate the return data to a frequency determined by the CMTS (typically below 40 MHz). The return path data will pass from CIB 14 to service module 40. At service module 40, communication service module 40 will pass the return path data to the CMTS at the headend.

Cable telephony will be handled in a similar manner. Communication service module 49 in service module 40 will pass the telephony communication between the headend and each CIB 14. In accordance with this aspect of the invention, CIB 14 may be equipped with a cable telephone network interface device (NID) for handling the cable telephone functionality.

In accordance with another embodiment of the present invention, data and telephony communication between service module 40 and the user modem 66 of CIB 14 may be on a separate dedicated two-way communication line, such as a telephone line or the like. In this case, communication module 49 will handle both forward and return data in the same manner as discussed above. Similarly, the system can be configured so that forward path communication between service module 40 and CIB 14 is via communication line 16, and the return path communication from CIB 14 to service module 40 is via a separate communication line, such as a twisted pair telephone line (POTS, xDSL, etc.), or the like.

Figure 5:
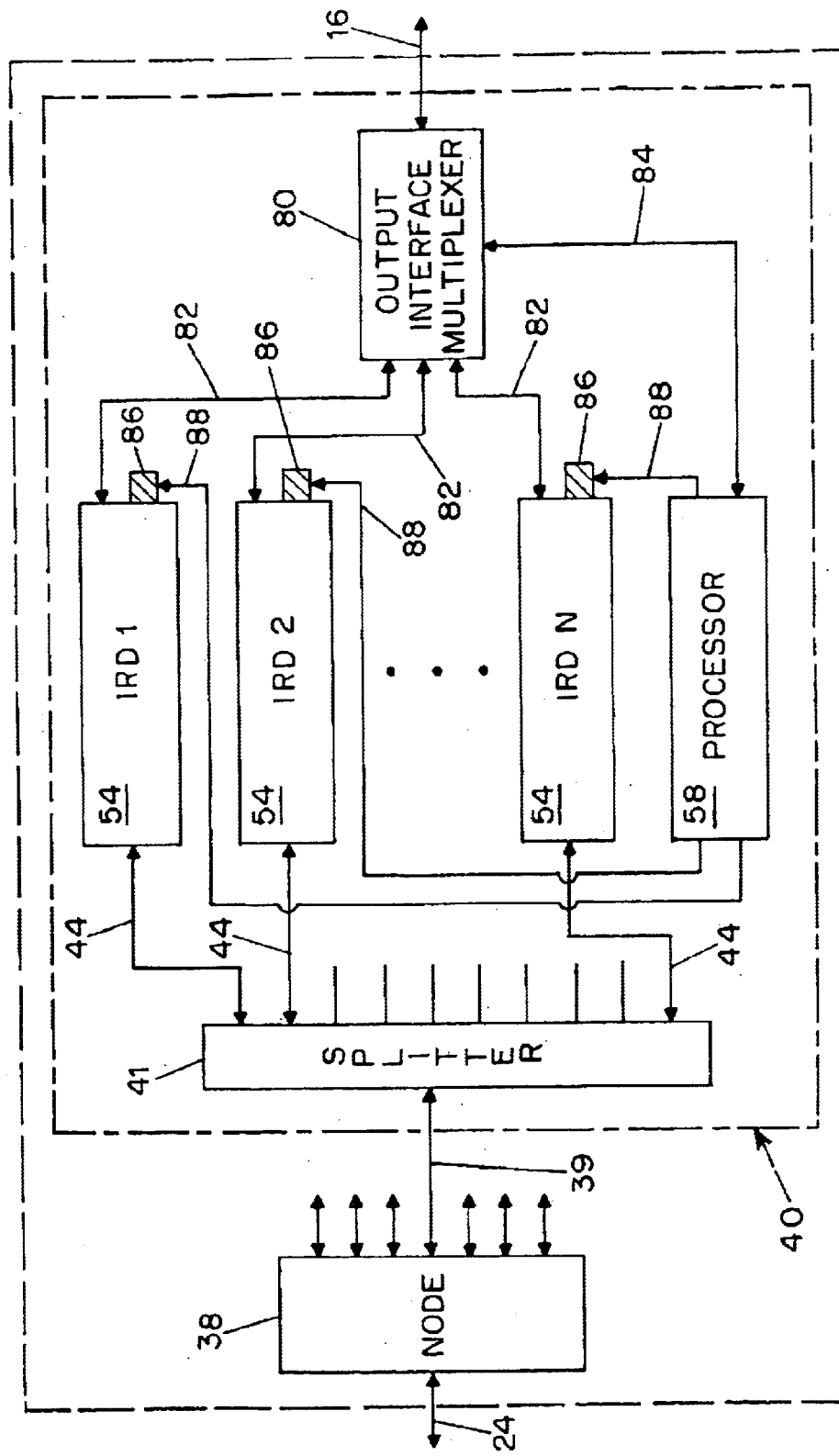
FIG. 5 is a schematic diagram of a service module in which the processor communicates with the IRD's with an infrared transceiver.

Referring now to FIG. 5, another embodiment of a service module 40 is illustrated. In accordance with this particular embodiment of the present invention, service module 40 preferably is configured to only provide video services to the end user. In this manner, service module 40 includes an integrated receiver decoder (IRD) 54 for each end user television connected to service module 40. Service module 40 of this particular embodiment may be configured from a plurality of commercially available IRD's. However, many commercially available IRD's receive commands from infrared remote control devices. Therefore, in order for processor 58 to communicate with IRD's 54, infrared transmitters 86 preferably are used. Processor 58 sends commands to infrared transmitters 86 via communication connection 88, and transmitters 86 communicate the commands to IRD's 54 using an infrared transmission. When IRD's 54 receive the command from processor 58 to select and transmit a particular video channel, IRD's 54 select the requested channel, decrypt or descramble it, convert it to baseband or a low frequency channel, and then send the channel to output interface MUX 80 for transmission to the associated CIB 14. Service module 40 may comprise a single output interface MUX 80 for all IRD's 54 as illustrated in FIG. 5, or each IRD 54 may have its own output interface MUX 80 associated with it. This allows the use of commercially available IRDs to accomplish the same goal of using existing wiring.

Figure 6:
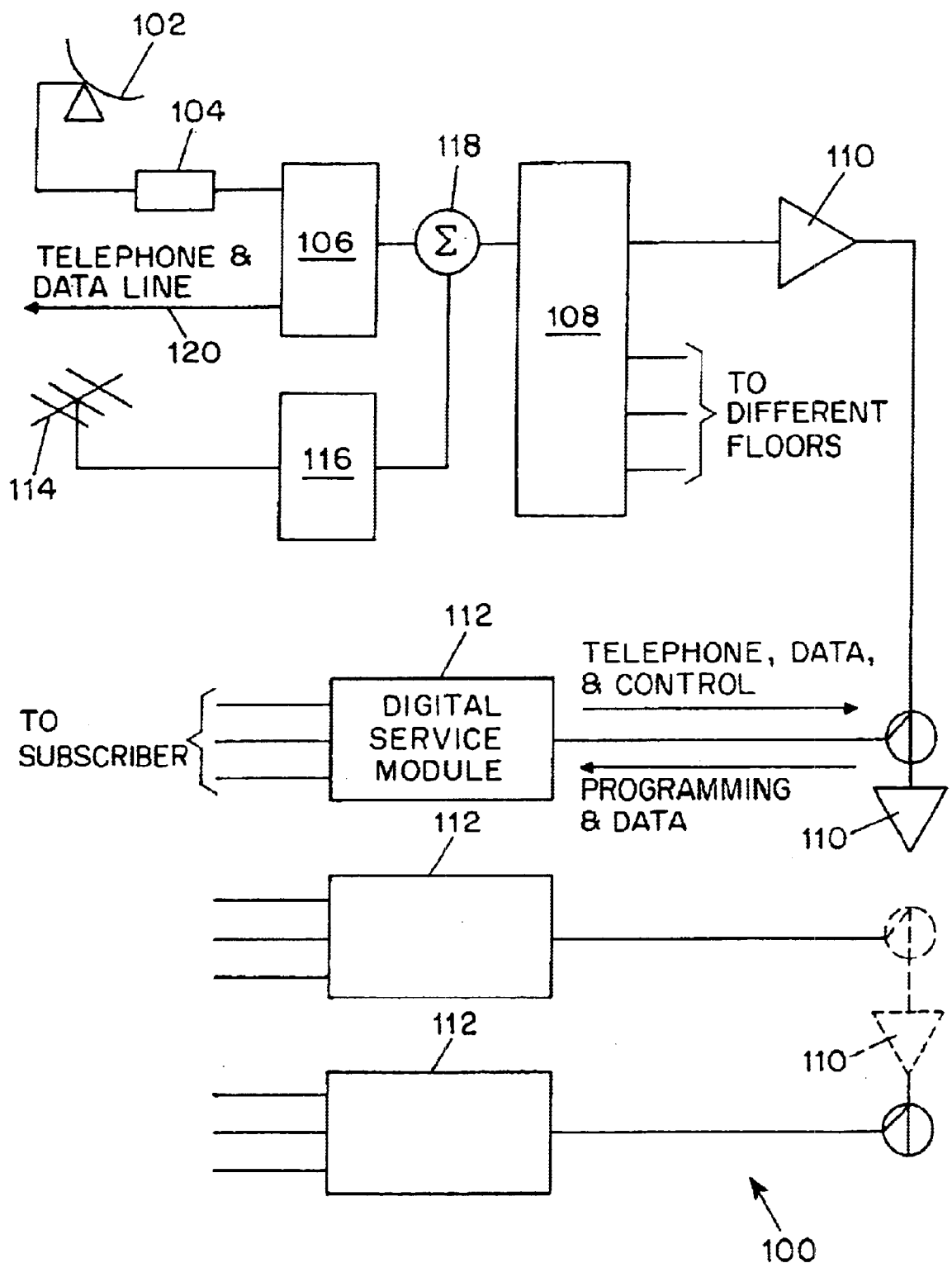
FIG. 6 is a schematic diagram of a signal distribution system designed for apartment or multiple dwelling unit use.

Referring now to FIG. 6, another embodiment of the present invention is shown. In accordance with this particular embodiment, a telecommunication system 100 is configured to deliver a variety of telecommunication services to customers or users residing in multiple dwelling units (MDUs) or shared-antenna complexes (SAC), such as apartment houses, town homes, a cluster or group of single family homes, office buildings, campuses, or any other group of users that utilize a single antenna or common group of antennas.

As one skilled in the art will appreciate, delivering direct-to-home satellite transmission to residents in MDU complexes or SACs is difficult because it is difficult or impossible to add individual satellite antennas for each unit. Thus, to overcome this problem, some SACs place a single antenna or group of antennas on the roof or other location on the SAC property and transmit the signal to the individual resident homes. The antennas typically are 18" Ku band antennas, 30" medium power antennas, or the larger C-band TV receive only (TVRO) antennas. The problem with these systems is that they require separate, expensive receiver decoders for each resident unit, increasing the cost of the system, and thus making it difficult to compete with traditional cable television systems. In addition, the current systems have no means for providing additional telephone and computer access services. Therefore, it is desirable to have a system which can provide satellite TV, local TV, telephone and computer services to customers in SACs at a reasonable expense.

The telecommunication system 100, illustrated in FIG. 6 is configured to provide such services. In particular, telecommunication system 100 comprises one or more master antennas 102, a low noise block (LNB) converter 104, a multiplexer (MUX) 106, a power divider circuit 108, a plurality of signal amplifiers 110, and one or more service modules 112.

In accordance with one embodiment of the present invention, master antenna 102 is configured to receive a variety of television programming channels from a direct broadcast satellite (DBS) video service provider. The video channels may comprise a variety of cable channels, as well as pay-per-view and video on demand services. Preferably, the video signal received by antenna 102 is a 500 MHz bandwidth or a 1000 MHz bandwidth signal in the Ku frequency band. LNB converter 104 receives the signal and converts it to the L band frequency range, approximately 950 to 1450 MHz and 1450 to 2050 MHz. This 500–1000 MHz bandwidth signal may be divided into about 20 to about 40 transponder slots, each of which may carry an analog video channel or about 1–20 digitally compressed video channels. Each transponder slot comprises a frequency band of between about 25 MHz to about 50 MHz, and more preferably about 36 MHz.

From LNB converter 104, the analog and/or digitally compressed video signal passes to MUX 106, which as discussed in greater detail above, separates the downstream signals from the return path signals. From MUX 106, the signal passes through power divider circuit 108, which divides and amplifies the signal into a plurality of signals, preferably one signal for each floor or two, townhouse group, or groups of apartments, such as cluster homes, garden apartments, etc. The output from each individual divided line then is transmitted to one or more service modules 112 for the particular floor or group. As one skilled in the art will appreciate, as the signals are transmitted to the various service modules 112 on the various floors or home groups, it may be desirable to amplify the signals as they are transmitted. Thus, as illustrated in FIG. 6, the signals may pass through one or more signal amplifiers 110. The number and location of signal amplifiers 110 will depend on the particular configuration of the SAC.

In accordance with another embodiment of the present invention, the signal from antenna 102 and LNB 104 may be converted to an optical signal using an electrical to optical converter (not shown) and sent over a fiber-optic cable to the service modules 112 on the various floors or at other relatively secure locations. The service modules 112 then preferably are configured to convert the optical signal back to electrical and then process the signal accordingly.

In accordance with the illustrated embodiment, service modules 112 are similar to the service modules discussed above with reference to FIG. 4. Therefore, service modules 112 may be configured to receive the video signals in analog form, digitally compressed form, or both. If handling digitally compressed signals, which signals from the satellite typically are, service modules 112 includes circuitry to decompress digitally compressed video signals. In accordance with this aspect of the invention, service modules 112 preferably comprise about 10 to about 20 integrated receiver decoders or IRD chipsets (interchangeably referred to herein as IRDs) (one for each user television connected to service module 112). The IRDs preferably extract the transponder frequency band from the compressed video signal which includes the requested channel for the particular user and demodulates it to baseband frequency. The IRD then decompress the frequency band into the 10 to 20 individual channels that were digitally compressed into that band. If the signal was sent encrypted, the IRD or the processor then decrypts the signal. Finally, service module 112 extracts the requested video channel and transmits it to the user at baseband, or remodulates the signal to a channel frequency, such as channel 2, 3, 4 or 5. If service module 112 receives analog video signals, it preferably will process these signals in the same manner as service modules 40 in FIG. 4.

In accordance with another embodiment of the present invention, system 100 further may comprise an antenna 114 for receiving local broadcast television signals, and/or a cable connection (not shown) for receiving channels from a cable company. As one skilled in the art will appreciate, local broadcast channels typically are analog, unencrypted and are resident in the 50–850 MHz bandwidth. In accordance with this aspect of the present invention, the signal from antenna 114 preferably passes to a frequency converter 116, which may or may not convert the received local broadcast signals to different frequencies. From frequency converter 116, the signal passes to a summing circuit 118. Similarly, channels from the cable system may be passed directly to summing circuit 118, or they first may be converted to different frequencies prior to being passed to summing circuit 118.

Summing circuit 118 may combine the local broadcast signals and the cable signals with signals received from satellite antenna 102 and passes the signals to power divider 108. In this manner, system 100 can provide satellite channels, local broadcast channels and channels from a cable company to the users, a solution which most satellite service providers cannot currently provide, even to stand alone homes. Also, as one skilled in the art will appreciate, if the local broadcast and cable signals are analog and the satellite signals are digital, the summing circuit 118 will sum the analog signals with the digital signal and pass all the signals to service module 112. Service module 112 then will be configured to process both analog and digital signals. In addition, in accordance with an alternative embodiment of the present invention, instead of combining the analog and digital signals, the analog signals may be passed to service module 112 on one communication connection and the digital signals may be passed to service module 112 on a separate communication connection.

In accordance with one embodiment of the present invention, the local broadcast channels are received by service module 140 and passed to an end user without being processed by service module 112. For example, the local broadcast signals pass from node 38 directly to output interface MUX 46 via a communication path 122 (see FIG. 4) and then out to the end user via communication connection 16. In this manner, end users can receive local broadcast stations via connection 16 without having a CIB 14 and without subscribing to cable or DBS services.

System 100 also can be configured to provide telephone and computer services to the customers residing in the MDUs and/or SACs. As with the system illustrated in FIG. 1 and described above, customer service requests, as well as telephone and computer access preferably originate from a customer interface box (CIB) located at the user site. From the CIB, the service requests and telephone and computer signals are communicated to service modules 112. Service modules 112 process the service requests and forward the telephone and computer signals on to a telephone system and/or a computer or internet access facility, respectively. In accordance with this aspect of the invention, the telephone and computer signals from service modules 112 preferably pass back through MUX 106, which separates the forward and return path signals. The return path signals (i.e., telephone and computer signals) then are connected from MUX 106 to the appropriate locations via a suitable connection 120, such as a phone line, cable line, cellular connection, microwave transmission or the like. For example, a telephone call may be connected to a local PBX, or the telephone call may be connected directly to a long distance carrier. Similarly, the computer signals may be connected to one or more internet or computer network access services, as discussed above.

Figure 7:
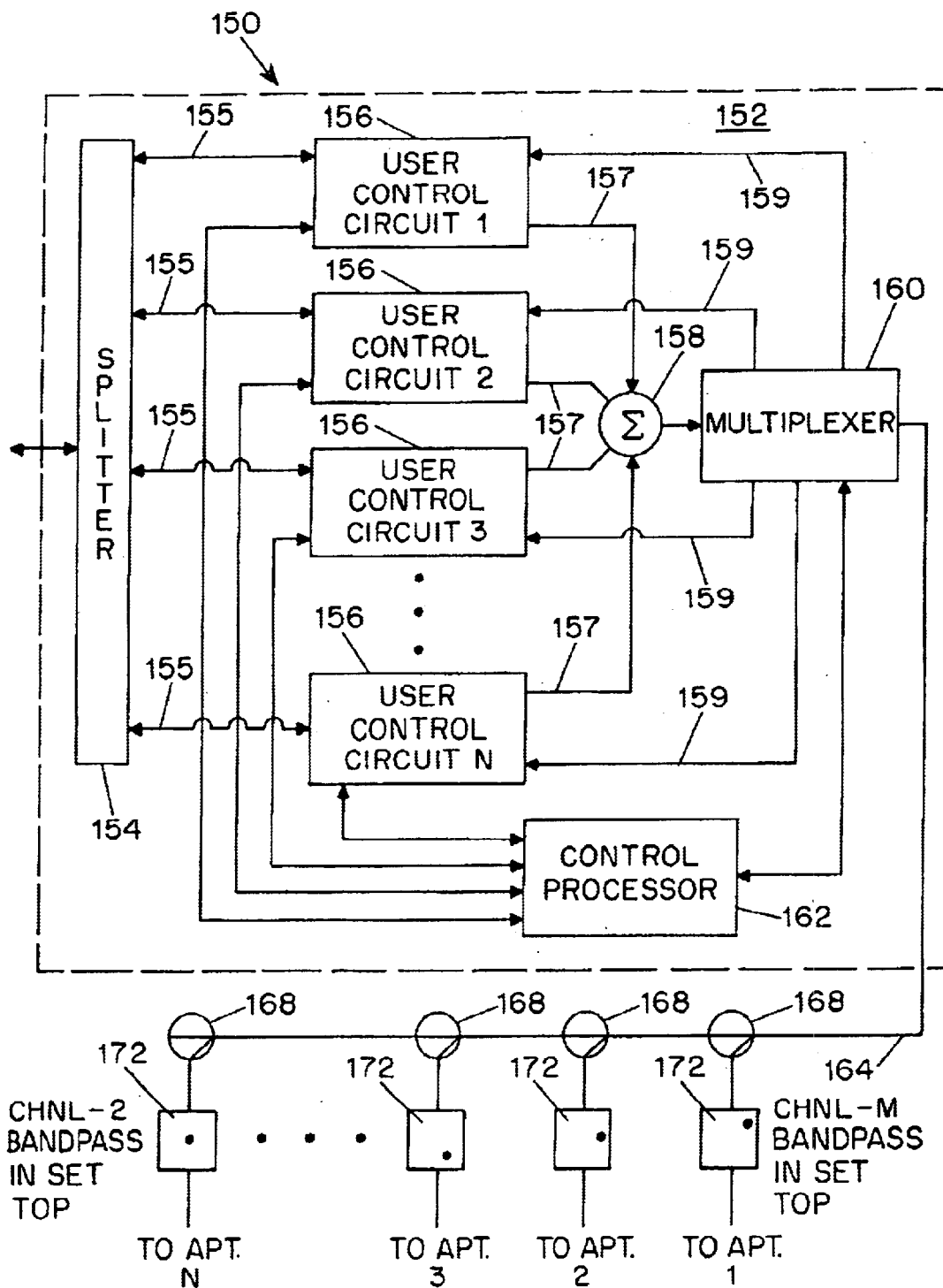
FIG. 7 is a schematic diagram of a signal distribution system designed for loop-through cable systems.

Referring now to FIG. 7, yet another embodiment of the present invention is shown. In accordance with this particular embodiment of the present invention, a service module 152 is configured to provide telecommunication services to users wired together serially in a loop-through system. For example, in many older apartment buildings, a single cable passes serially from one apartment to the next, and so on. Typically, a loop circuit will connect apartments on the same floor, although it does not have to be configured that way. In accordance with these loop-through systems, each apartment typically comprises a coupler that splits off the signal so that one or more televisions in that apartment can be connected to the loop-through system. Buildings with loop-through wiring traditionally have been very difficult to upgrade to provide premium channels, pay-per-view channels, or even additional cable channels. In addition, it is extremely difficult to provide two-way communications, such as telephone and computer services over the cable with the traditional loop-through systems. However, service module 152 is adapted to provide such services to users connected to loop through systems.

In accordance with this particular embodiment of the present invention, service module 152 preferably comprises a splitter 154, a plurality of user control circuits (UCCs) 156, a summing circuit 158, a multiplexer (MUX) 160, and a control processor 162. As with service module 40 illustrated in FIG. 4, splitter 154 is configured to receive signals from and transmit signals to a headend system providing video, telephone, and/or computer services. In addition, splitter 154 amplifies and distributes signals to individual UCCs 156 in service module 152 through splitter connections 155.

As with the user control circuits 42 of service module 40, user control circuits 156 are configured to communicate with the individual apartments in the loop-through circuit, and comprise a service interface MUX, an integrated receiver decoder, a communication service module, and a modulator. The service interface MUX, the integrated receiver decoder, the communication service module, and the modulator all operate in the same manner as the equivalent components in service module 40 discussed above, except that instead of each IRD in UCC 156 transmitting video channels at base band or at a low frequency channel like 2, 3, 4, or 5, in the loop-through system, the video signal to be sent to the apartment furthest away from service module 152 preferably is modulated onto channel 2, the signal for the next closest apartment preferably is modulated onto channel 3, and so on, with the signal for the nearest apartment to service module 152 being modulated onto the highest channel number. With this particular configuration, if there are "N" number of total apartments on the loop through circuit, preferably there are at least "N" UCCs 156 in service module 152, and the IRD in UCC "N" preferably modulates its requested video signal to the frequency associated with channel M, where M=N+1. Thus, for example, if a loop-through system on a particular apartment building floor services ten (10) apartments, the video signal for the apartment closest to the service module, preferably will be modulated onto channel 11. This particular configuration minimizes the loss to the furthest apartment.

After the IRDs in UCCs 156 modulate the signals to the particular channel frequencies, the modulated output from UCCs 156 then are passed to a combiner circuit 158 via connections 157, and combined into a single signal. The signal then is transmitted through an output MUX 160 to cable 164 feeding all the apartments in the loop-through circuit. The loop-through cable 164 passes through a coupler 168 at each apartment, thus tying each apartment to the loop-through circuit. That is, at least one customer interface box (CIB) 172 in each apartment are attached to the loop-through circuit through a coupler 168.

To extract the proper channel for each apartment, coupler 168 CIB 172 preferably includes a band pass filter (BPF) which allows only that particular apartment's channel(s) to be made available to the TV set(s) in that apartment. For example, for apartment 1, coupler 168 or CIB 172 includes a BPF which allows only channel 2 to be viewed by the users in apartment 1 an no other channels. Similarly, in apartment "N", coupler 168 or CIB 172 includes a BPF which allows channel "M" to be viewed by the users in apartment "N". In this manner, service module 152 can provide the premium and pay-per-view channels to the users which pay for those services. As one skilled in the art will appreciate, if the BPF is configured with coupler 168, only a single channel will pass to CIB 172. However, if the BPF is configured in CIB 172, all channels 2-M will pass to CIB 172 in each apartment, and the proper channel for a particular apartment will be extracted by CIB 172. In accordance with a preferred embodiment of the present invention, to prevent users in apartments from stealing signals directed to the other apartments, coupler 168 and the BPF preferably are configured together, and apart from CIB 172 (see FIG. 8).

Figure 8:
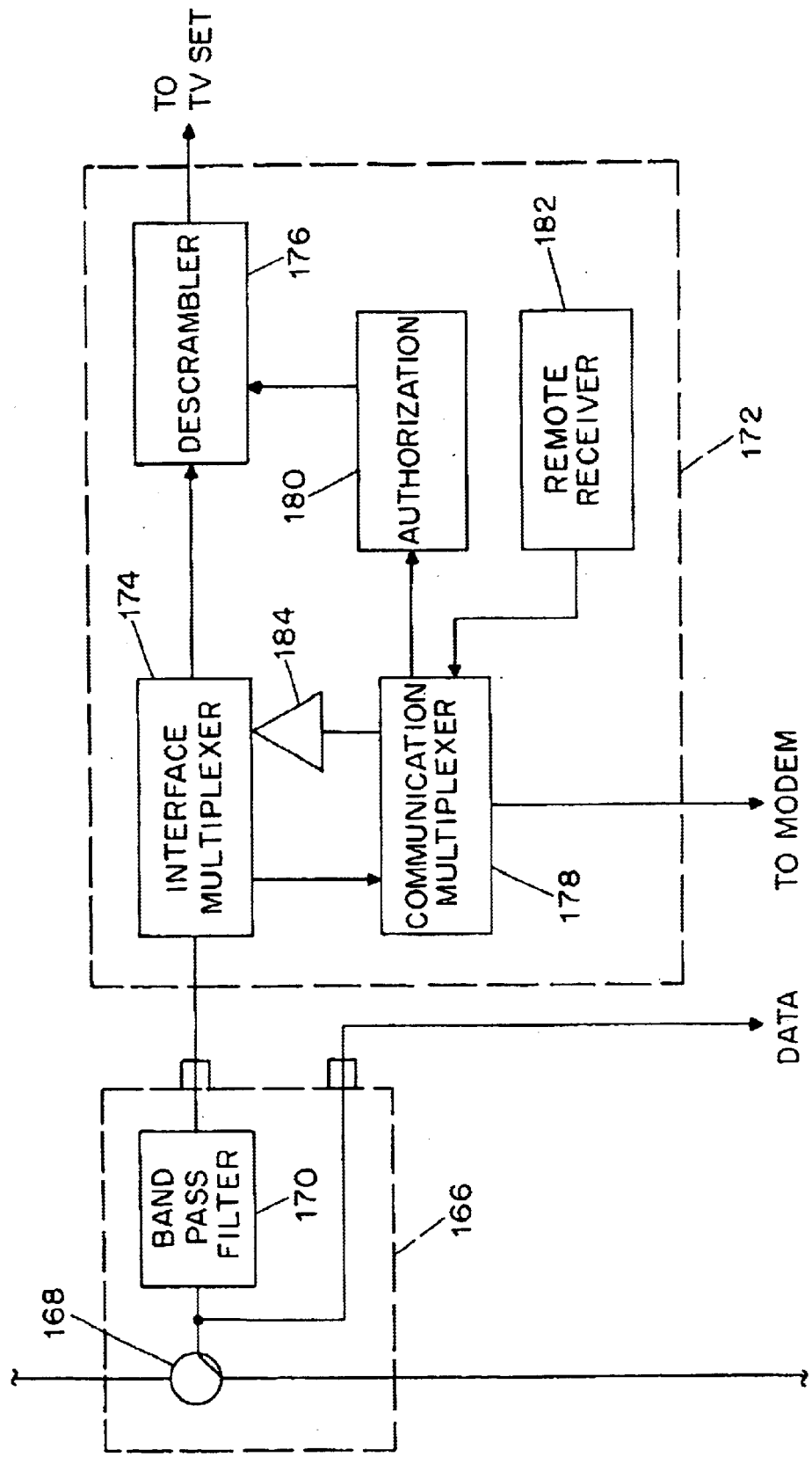
FIG. 8 is a schematic diagram of a customer interface box which may be used with the signal distribution system of FIG. 7.

Referring now to FIG. 8, a more detailed diagram of a coupler box 166 and a CIB 172 are illustrated. In particular, coupler box 166 includes a splitter or coupler 168 and a band pass filter (BPF) 170. CIB 172 includes an interface multiplexer 174, a descrambler 176, a communication multiplexer 178, an authorization module 180, and a remote receiver 182.

In the embodiment illustrated in FIG. 8, the splitter or coupler 168 and BPF 170 are configured separate from CIB 172. However, in accordance with an alternative embodiment of the present invention, splitter or coupler 168 and BPF 170 may be configured within CIB 172.

Each coupler 168 and BPF 170 combination only allows the channel(s) associated with a particular apartment to pass to CIB 172. The signal passes from coupler 168 to BPF 170 and then to interface multiplexer 174, which separates the video channels, the reverse path data and the forward path data. The video channels pass from interface multiplexer 174 to descrambler 176. If one or more TV sets in that apartment are authorized to receive premium or pay channels, the descrambler will descramble the premium or pay channels and make them available to the TV sets in the apartment. As one skilled in the art will appreciate, if an apartment has more than one TV set, the apartment may receive multiple video channels; preferably one for each TV set.

The forward path data, voice and authorization information are divided out by interface multiplexer 174 and passed to communication multiplexer 178. Typically, the data information, voice information and authorization command information are sent to the individual customers on dedicated channels determined by the cable system and/or assigned in the service module. These frequencies are common to all subscribers, with the data, voice and authorization command information having additional address information, so that CIB 172 will receive and process the data, voice and authorization information directed to that CIB for that apartment. When communication multiplexer 178 receives the data, voice and authorization command information, it separates the information and passes the data and voice information to a modem, and passes the authorization information to authorization module 180. The modem will process the voice and data information in a manner similar to the modems illustrated in FIGS. 2 and 3 and described above. Authorization module 180 receives the authorization information, processes it, and sends descrambling commands to descrambler 176. That is, if the user in the particular apartment is authorized to view a premium channel or a pay-per-view channel, authorization module 180 will verify the authorization information and then pass a descrambling command to descrambler 176. Upon receipt of the descrambling command, descrambler 176 to descramble the scrambled signal. As discussed briefly above, descrambler 176 may comprise a diode circuit that, upon command, restores the synchronization pulse, allowing the picture to be horizontally synchronized. In addition, descrambler 176 may encompass other descrambling or decryption techniques.

As discussed above, a user of CIB 172 in an apartment can select the channel he/she wants to watch by using a remote control device. Remote receiver 182 will receive the signal from the remote control device and pass it to communication multiplexer 178. In addition, voice and/or computer data from a modem or directly from a telephone or a PC also will pass into communication multiplexer 178. Communication multiplexer 178 will format this information into the 1to 40 MHz bandwidth spectrum. Communication multiplexer 178 then will pass the reverse path information through a reverse path amplifier 184 into interface multiplexer 174. Reverse path amplifier 184 amplifies the signal so that the losses caused by the splitter in the return transmission path are compensated for. Interface multiplexer 174 then will pass the information back through coupler 168 and then back to service module 152. As one skilled in the art will appreciate, while amplifier 184 is positioned between communication MUX 178 and interface MUX 174, the amplifier can be located anywhere in the circuit, including within communication MUX 178 and/or interface MUX 174.

At service module 152, the return path data is handled in a manner similar to service module 40 is discussed above. That is, the return path data, including service requests and telephone and computer information, preferably transmit back to MUX 160 through the return path of loop-through cable 164. MUX 160 passes service requests to control processor 162 and the computer and voice information for each apartment back to the UCC 156 associated with that apartment via connections 159. For the service requests, control processor 162 verifies that the customer is authorized to receive the requested channel. If so, control processor 162 sends a message to the IRD associated with that user to demodulate and descramble that channel and provide it to the requesting user. The protocol does not change even though the CIBs are on a serial bus rather than on a parallel bus, since each CIB 172 must identify itself to the microprocessor. However, when more than one user makes a request, a queuing system preferably is used. In this manner, control processor 162 preferably handles the service requests on a first come, first served basis.

While not discussed in detail herein, service module 152 and, in particular, UCCs 156 will handle the telephone and computer services in a manner similar to service modules 40 as discussed above. Also, while this embodiment of the present invention is described herein with reference to apartments with loop-through configurations, one skilled in the art will appreciate that the present invention can be used with other loop-through set-ups. For example, rural cable systems in which individual farm houses are connected to a single cable with couplers or splitters also can utilize the present invention.

Figure 9:
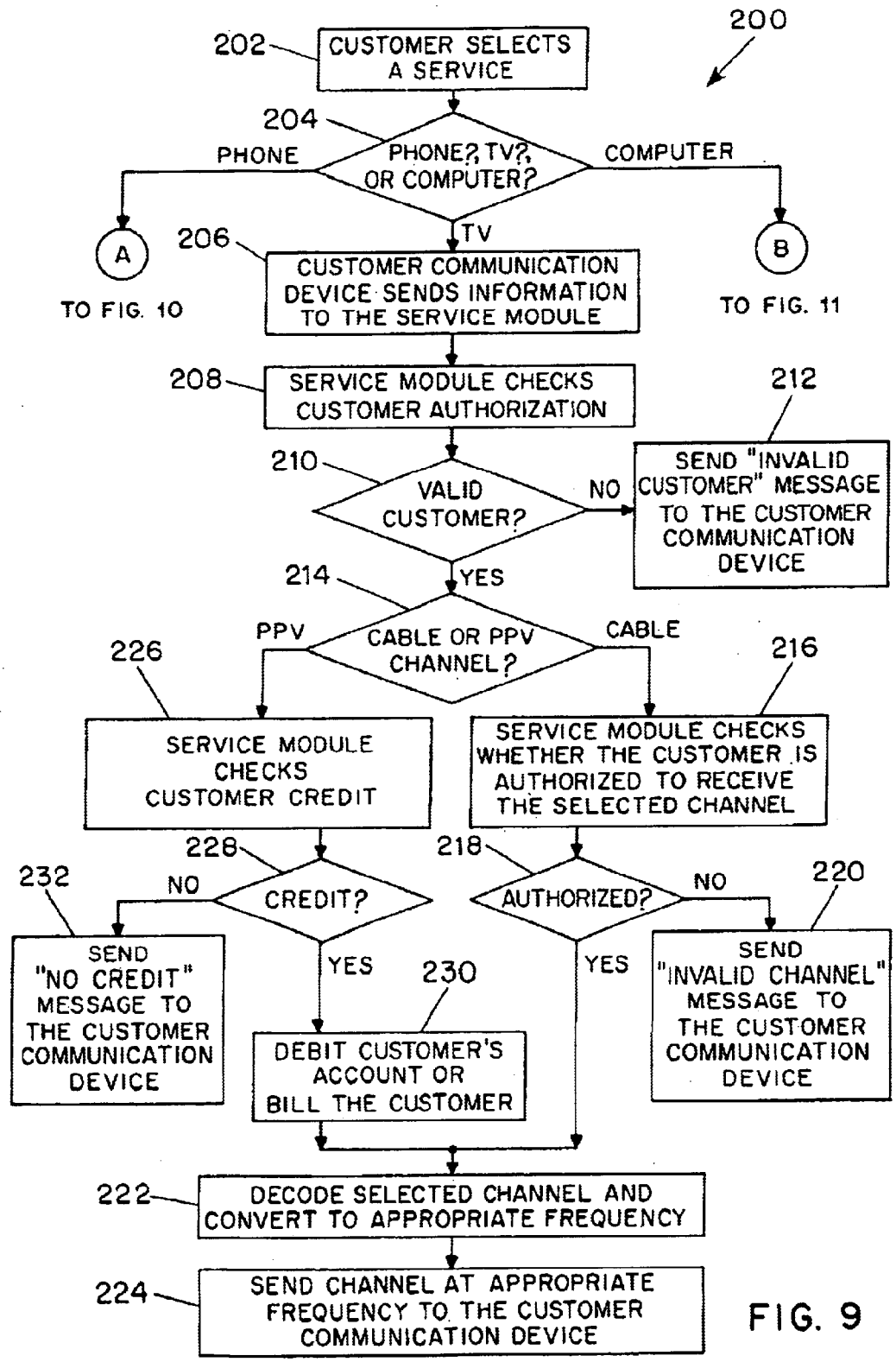
FIG. 9 is a flow diagram illustrating a method of using the telecommunications circuit or system.
Figure 10:
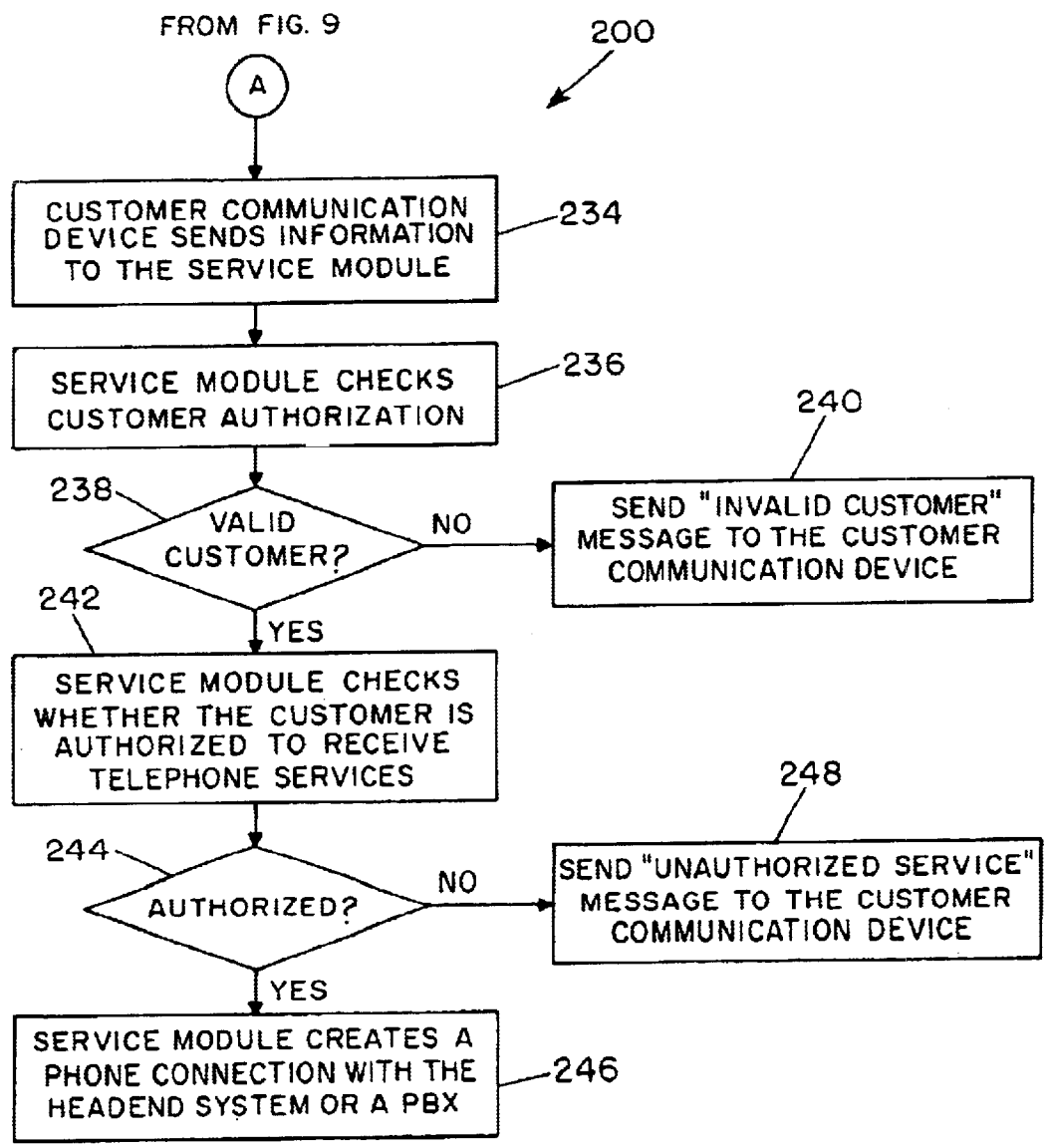
FIG. 10 is a flow diagram illustrating a method for customer telephone communication with the telecommunications system.
Figure 11:
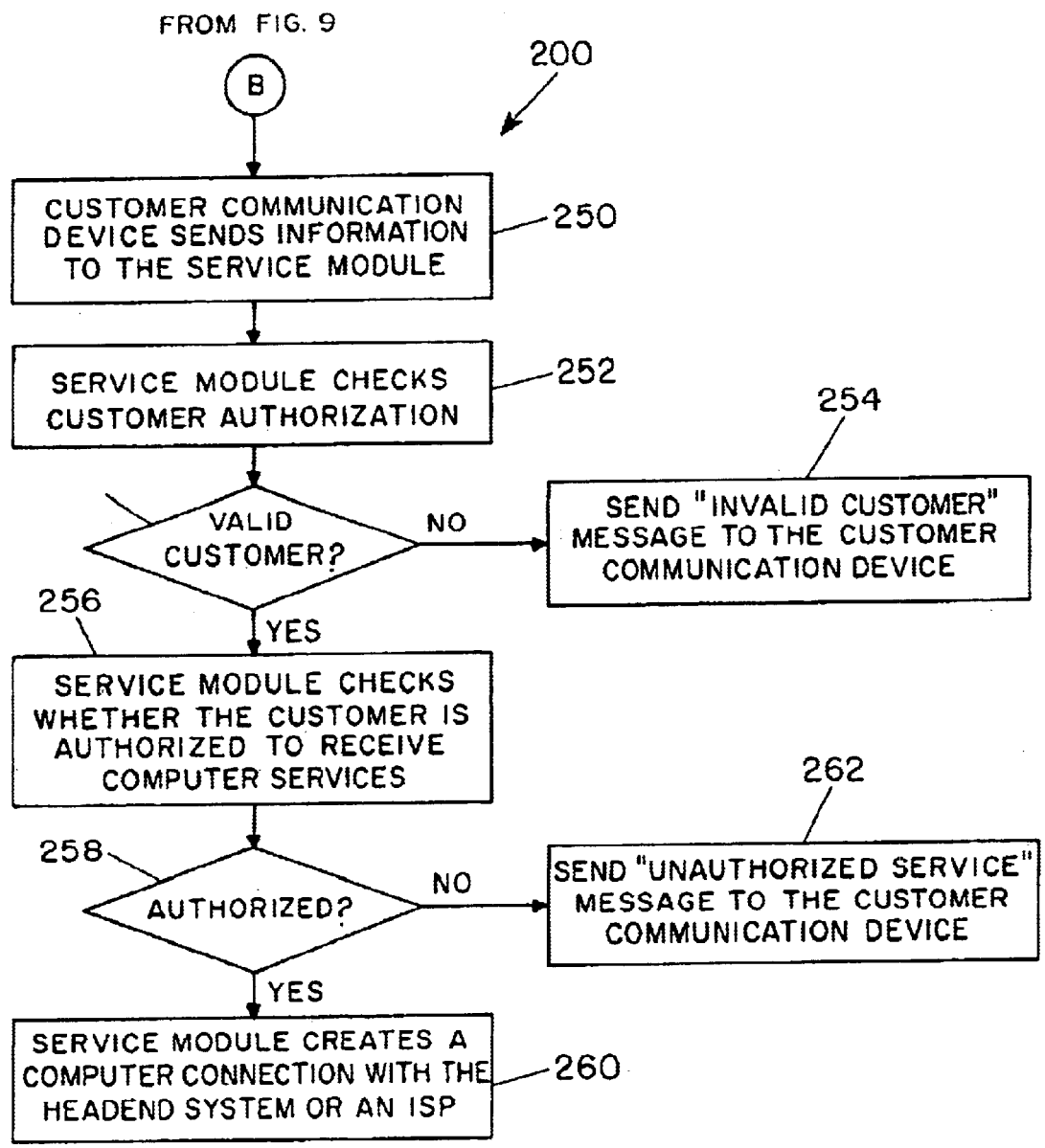
FIG. 11 is a flow diagram illustrating a method of customer data or computer communication with a telecommunications system.

As described above, the present invention provides for a simple, efficient method for a user or subscriber to select a desired service, and for a system to determine if customer or user is valid for that service, and, if so, supply the selected service. Referring now to FIGS. 9, 10 and 11, a flow chart 200 of a method for providing telecommunication services to customers or users is illustrated. In accordance with a preferred method, the customer or user preferably chooses a telecommunication service, such as video, telephone, or computer services. The flow process for telephone services is shown in FIG. 10, while the flow process for computer services is shown in FIG. 11.

Referring now to FIG. 9, the method for providing video services will be discussed. In particular, when a customer selects a video channel for viewing (step 202), the customer communication device or set-top box determines that a video service was requested (step 204) and preferably communicates the selected channel and other user information to the service module (step 206). The service module receives the request and the service module's processor then checks the customer authorization (step 208) and determines whether or not the customer is a valid user (step 210). If not, the service module sends an invalid customer message to the customer communication device and refuses service (step 212). If the customer has a valid account, the cable or paid television channel is selected and processed accordingly (step 214). If a cable channel is selected, the service module checks to determine whether or not the customer is authorized to receive the selected channel (step 216 and 218). If not, an invalid channel message is sent to the customer (step 220). If the customer is authorized to receive the selected cable channel, the signal is decoded and converted to the proper frequency (step 222). Once converted, the signal is sent to the requesting user (step 224).

If a pay-per-view selection is selected by the customer, the service module checks the customer's credit (steps 226 and 228) and, if valid, charges the customer's account or bills the customer (step 230). The service module then decodes the selected channel (step 222), and sends it at the appropriate frequency to the customer's communication device (step 224). If credit is refused, the customer is so advised (step 232).

Telephone and computer selections are handled similarly, as shown in FIGS. 10 and 11. If the customer selects telephone services (FIG. 10), the customer communication device sends a telephone request and the requested telephone number to the service module (step 234). The service module checks the customer authorization (step 236) and determines whether or not the requester is an authorized customer (step 238). If not, the service module sends an invalid customer message to the requesting customer communication device (step 240). If the customer is a valid customer, the service module creates a phone connection between the customer's phone and the headend system, a PBX or a long distance carrier (step 246). Otherwise, the service module sends an unauthorized service message to the requesting customer communication device (step 248).

Likewise, if the customer selects computer communication (FIG. 11), that information is sent by the customer interface to the service module (step 250), wherein the service module again checks customer service authorization (steps 252–258), and, if authorized, the customer receives the desired computer service and the service module creates a computer connection with the headend system (e.g. using a CMTS) or an Internet service provider (step 260). Otherwise, exception messages are sent to the user (steps 254 and 262).

If there is an incoming telephone call to the customer, the service module preferably verifies that this is a valid customer with telephone services, makes a MUX connection to the customer's set-top interface, sends the call through to the customer, and the customers telephone rings. Telephone services offered by the telephone provider can be passed to the customer in the usual manner for use in the usual way.

In conclusion, the present invention provides a novel telecommunication system for providing a plurality of telecommunication services to plurality of customers in a secure, inexpensive manner. While a detailed description of presently preferred embodiments of the invention have been given above, various alternatives, modifications, and equivalents will be apparent to those skilled in the art. For example, while different components or circuits of the service module of the present invention are described herein as performing certain specific functions, one skilled in the art will appreciate that other components or circuits in the service module may perform some or all of the service module functions without varying from the spirit of the invention. Therefore, the above description should not be taken as limiting the scope of the invention which is defined by the appended claims.

What is claimed is:

1. A telecommunication system for providing telecommunication services, including video, telephony and computer network services, to a group of end user sites connected to a loop-through cable distribution system, comprising:

a headend system which provides said telecommunication services in the form of telecommunication signals, said telecommunication signals comprising a video signal;

a service module in communication with said headend system and adapted to receive said telecommunication signals from said headend system and provide said telecommunication signals from said headend system to said group of end user sites, said service module comprising:

processing means for processing telecommunication service requests from said end user sites;

splitting means for receiving said video signal from said headend system and splitting said video signal into a plurality of video signals, one for each of said end user sites;

channel formatting means for each of said end user sites, said channel formatting means for receiving one of said plurality of video signals, extracting a video channel from said one of said plurality of video signals, said video channel being requested by one of said end user sites, demodulating said video channel from its modulated frequency to baseband, and creating an output video channel for said one of said end user sites by remodulating said video channel from baseband to a predetermined frequency, said predetermined frequency being different for each of said end user sites summing means for summing said output video channel from each of said channel formatting means into a composite video signal comprising each of said output video channels modulated to different frequencies;

a loop-through cable communication connection which communicates said composite video signal from said summing means to each of said end user sites;

coupling means for coupling said communication connection to an end user site;

filter means for filtering said output video channel for said end user site from said composite video signal, creating an end user video signal; and a customer interface device which receives said end user video signal and transmits said end user video signal to a video signal viewing apparatus;

wherein there are N number of end user sites and N number of corresponding channel formatting means, and wherein X represents a particular end user site and channel formatting means and X can vary from 1 to N, such that a particular channel formatting means X creates said output video channel for end user site X at a frequency associated with channel M, wherein M=X+1; and wherein said end user site 1 is furthest from said service module and end user site N is closest to said service module.

2. The system as recited in claim 1, wherein said telecommunication signals from said headend system carries analog signals, digital signals, digitally compressed signals, or any combination of analog, digital, and digitally compressed signals.

3. The system as recited in claim 1, wherein channel formatting means further comprises decoder means for extracting said requested video channel from said multiplexed channel signal and demodulating said video channel from its modulated frequency to baseband.

4. The system as recited in claim 3, wherein after said decoder means demodulates said requested video channel to baseband, said decoder means then remodulates said requested video channel to said predetermined frequency.

5. The system as recited in claim 4, wherein said predetermined frequency comprises a frequency associated with a single television channel.

6. The system as recited in claim 1, wherein said filter means comprises a band pass filter.

7. The system as recited in claim 1, wherein said filtering means is configured with said coupling means.

8. The system as recited in claim 1, wherein said filtering means is configured in said customer interface device.

9. The system as recited in claim 1, wherein said telecommunication signals comprise telephony signals, and said service module further comprises telephony interface means for connecting telephone calls between a telephony service provider and a telephone connected to a customer interface device at an end user site, wherein when a service request from an end user site comprises a request to connect a telephone call from said end user site to another party having telephony services, said processing means checks to determine if said end user site is authorized for telephony services, and if said end user site is authorized for said telephony services, said telephony interface means of said service module connects said user telephone call to said telephony service provider, which in turn, connects said telephone call to said another party.

10. The system as recited in claim 9, wherein said telephony interface means of said service module connects said end user site telephone call to said headend system, which in turn, connects said end user site telephone call to said telephony service provider, which in turn, connects said telephone call to said another party.

11. The system as recited in claim 1, wherein said telecommunication signals comprise computer data signals, and said service module further comprises computer network interface means for connecting a computer connected to a customer interface device at an end user site to a computer network, wherein when a service request from an end user site comprises a request to connect said computer at said end user site to said computer network, said processing means checks to determine if said end user site is authorized for computer network interface services, and if said end user site is authorized for said services, said computer network interface means of said service module provides a data connection between said network and said computer connected to said customer interface box at said end user site.

12. The system as recited in claim 11, wherein said computer network interface means of said service module connects said computer connected to said customer interface device to said headend system, which in turn, connects said computer to said computer network.

13. The system as recited in claim 1, wherein said telecommunication signals comprise forward path data signals, which may include one or more of telephony signals, computer data signals, and information messaging signals, and wherein said forward path data signals are transmitted from said service module to a customer interface device at an end user site at baseband.

14. The system as recited in claim 1, wherein said telecommunication signals comprise forward path data signals, which may include one or more of telephony signals, computer data signals, and information messaging signals, and wherein said forward path data signals are transmitted from said service module to a customer interface device at an end user site by modulating said forward path data signals to one or more frequencies corresponding to one or more channel frequencies and transmitting said forward path data signals to said customer interface device at said one or more channel frequencies.

15. The system as recited in claim 1, wherein return, path data signals from said customer interface device may include one or more of telecommunication service request signals, telephony signals, computer data signals, information messaging signals, and wherein said return path data signals are transmitted from said customer interface device to said service module by modulating said return path data signals to one or more frequencies corresponding to one or more channel frequencies and transmitting said return path data signals to said service module at said one or more channel frequencies.

16. The system as recited in claim 1, wherein return path data signals from said customer interface device may include or more of telecommunication service request signals, telephony signals, computer data signals, information messaging signals, and wherein said return path signals are transmitted from said customer interface device to said service module by modulating said return path data signals to one or more frequencies between about 4 MHz and about 40 MHz and transmitting said return path data signals to said service module at said one or more frequencies.

17. The system as recited in claim 1, wherein return path data signals from said customer interface device may include one or more of telecommunication service request signals, telephony signals, computer data signals, information messaging signals, and wherein said return path data signals are transmitted from said customer interface device to said service module by transmitting said return path data signals over a communication path which is separate from the communication path in which signals are transmitted from said service module to said customer interface device.

* * * * *